United States Patent [19]
Kuroyanagi et al.

[11] Patent Number: 5,894,416
[45] Date of Patent: Apr. 13, 1999

[54] EQUIPMENT CONTROL UNIT

[75] Inventors: Satoshi Kuroyanagi, Tokyo; Masanori Miyata, Yokohama; Hideki Adachi; Shinichi Nakamura, both of Kawasaki; Naoyuki Ohki; Tokuharu Kaneko, both of Yokohama; Hiroshi Ozaki, Tokyo; Hisatsugu Tahara; Satoshi Kaneko, both of Kawasaki; Taisei Fukada, Tokyo; Mitsuharu Takizawa, Fuchu, all of Japan

[73] Assignee: Canon Kabushiki Kaisha, Tokyo, Japan

[21] Appl. No.: 08/391,839

[22] Filed: Feb. 17, 1995

Related U.S. Application Data

[63] Continuation of application No. 07/869,182, Apr. 16, 1992, abandoned.

[30] Foreign Application Priority Data

| Apr. 18, 1991 | [JP] | Japan | 385610 |
| Apr. 18, 1991 | [JP] | Japan | 385615 |
| Apr. 18, 1991 | [JP] | Japan | 385618 |

[51] Int. Cl.⁶ ............................ G05B 13/02; G03G 15/00
[52] U.S. Cl. ........................ 364/138; 399/8; 340/825.34
[58] Field of Search ........................ 364/132, 138, 364/479, 130, 131, 479.01–479.09, 479.11, 479.14, 184; 340/825.31, 825.34, 825.35; 355/200, 202, 206, 209, 308; 358/404, 406, 434–440, 444, 468; 379/93, 95, 100, 106, 102.02; 399/8, 1, 11, 81

[56] References Cited

U.S. PATENT DOCUMENTS

| 3,305,839 | 2/1967 | Looschen et al. | 340/172.5 |
| 3,623,013 | 11/1971 | Perkins et al. | 340/172.5 |
| 3,638,191 | 1/1972 | Mann | 340/163 |
| 3,656,145 | 4/1972 | Proops | 340/310 |
| 3,842,408 | 10/1974 | Wells | 340/216 |
| 3,858,181 | 12/1974 | Goldsby et al. | 340/150 |
| 3,916,177 | 10/1975 | Greenwald | 235/153 AK |
| 3,984,032 | 10/1976 | Hyde et al. | 222/26 |

(List continued on next page.)

FOREIGN PATENT DOCUMENTS

| 0121332 | 10/1984 | European Pat. Off. | G07C 9/00 |
| 0342910 | 11/1989 | European Pat. Off. | |
| 2635425 | 2/1990 | France | H04M 11/06 |
| 4006055 | 8/1990 | Germany | G03B 27/52 |
| 56-27161 | 3/1981 | Japan | G03G 15/00 |
| 59-22475 | 2/1984 | Japan | H04N 1/00 |
| 59-81656 | 5/1984 | Japan | G03G 15/00 |
| 59-89067 | 5/1984 | Japan | H04N 1/00 |
| 59-91456 | 5/1984 | Japan | G03G 15/00 |
| 59-116761 | 11/1984 | Japan | G03G 15/00 |
| 60-101664 | 6/1985 | Japan | G06F 13/40 |
| 60-230167 | 11/1985 | Japan | G03G 15/01 |
| 62-84653 | 4/1987 | Japan | H04N 1/00 |
| 63-122349 | 5/1988 | Japan | H04M 11/00 |
| 2221122 | 1/1990 | United Kingdom | H04M 11/06 |

OTHER PUBLICATIONS

Xerox 1090 Copier Electronic Data Interface Operator Guide, Nov. 1988.
Kodak Ektaprint Brochure, Copyright, Eastman Kodak Company, 1986.

*Primary Examiner*—Reba I. Elmore
*Assistant Examiner*—Steven R. Garland
*Attorney, Agent, or Firm*—Fitzpatrick, Cella, Harper & Scinto

[57] ABSTRACT

An equipment control unit is composed of storage means for storing a control data for controlling an equipment, control means for controlling the equipment based on the control data stored in the storage means, and communication means for communicating with a centralized control system for making the centralized control for a plurality of equipments. The control means rewrites the control data stored in the storage means with a received control data when it receives the control data from the centralized control system.

27 Claims, 17 Drawing Sheets

OTHER PUBLICATIONS

| Patent No. | Date | Inventor | Class |
|---|---|---|---|
| 3,997,873 | 12/1976 | Thornton | 340/149 R |
| 4,124,887 | 11/1978 | Johnson et al. | 364/107 |
| 4,167,322 | 9/1979 | Yano et al. | 355/3 R |
| 4,188,668 | 2/1980 | Finlay | 364/900 |
| 4,199,100 | 4/1980 | Wostl et al. | 235/381 |
| 4,283,709 | 8/1981 | Lucero et al. | 340/147 R |
| 4,290,138 | 9/1981 | Bare et al. | 371/29 |
| 4,300,040 | 11/1981 | Gould et al. | 235/381 |
| 4,311,986 | 1/1982 | Yee | 340/825.63 |
| 4,312,066 | 1/1982 | Bantz et al. | 371/16 |
| 4,314,334 | 2/1982 | Daughton et al. | 364/200 |
| 4,358,756 | 11/1982 | Morel et al. | 340/539 |
| 4,369,442 | 1/1983 | Werth et al. | 340/825.35 |
| 4,432,090 | 2/1984 | da Silva | 371/32 |
| 4,455,453 | 6/1984 | Parasekvakos et al. | 179/2 AM |
| 4,456,790 | 6/1984 | Soyack | 179/18 ES |
| 4,477,901 | 10/1984 | Braband et al. | 371/15 |
| 4,496,237 | 1/1985 | Schron | 355/14 C |
| 4,497,037 | 1/1985 | Kato et al. | 364/900 |
| 4,501,485 | 2/1985 | Tsudaka | 355/6 |
| 4,506,974 | 3/1985 | Sugiura et al. | 355/14 R |
| 4,509,851 | 4/1985 | Ippolito et al. | 355/14 C |
| 4,510,491 | 4/1985 | Prato | 340/792 |
| 4,523,299 | 6/1985 | Donohue et al. | 364/900 |
| 4,545,013 | 10/1985 | Lyon et al. | 364/200 |
| 4,549,044 | 10/1985 | Durham | 179/5 R |
| 4,574,283 | 3/1986 | Arakawa et al. | 340/825.08 |
| 4,578,538 | 3/1986 | Pascucci et al. | 179/20 P |
| 4,583,834 | 4/1986 | Seko et al. | 355/14 C |
| 4,595,921 | 6/1986 | Wang et al. | 340/825.08 |
| 4,611,205 | 9/1986 | Eglise | 340/825.35 |
| 4,633,412 | 12/1986 | Ebert, Jr. et al. | 364/493 |
| 4,634,258 | 1/1987 | Tanaka et al. | 355/4 |
| 4,639,889 | 1/1987 | Matsumoto et al. | 364/900 |
| 4,652,698 | 3/1987 | Hale et al. | 380/24 |
| 4,654,800 | 3/1987 | Hayashi et al. | 364/479 |
| 4,658,243 | 4/1987 | Kimura et al. | 340/505 |
| 4,708,469 | 11/1987 | Bober et al. | 355/77 |
| 4,709,149 | 11/1987 | Takahashi et al. | 250/317.1 |
| 4,712,213 | 12/1987 | Warwick et al. | 371/15 |
| 4,723,212 | 2/1988 | Mindrum et al. | 364/401 |
| 4,742,483 | 5/1988 | Morrell | 364/900 |
| 4,745,602 | 5/1988 | Morrell | 371/20 |
| 4,752,950 | 6/1988 | Le Carpentier | 379/106 |
| 4,760,330 | 7/1988 | Lias, Jr. | 324/73 R |
| 4,766,548 | 8/1988 | Cedrone et al. | 364/479 |
| 4,823,343 | 4/1989 | Takahashi | 371/16 |
| 4,831,226 | 5/1989 | Robeson et al. | 364/189 |
| 4,845,483 | 7/1989 | Negishi | 340/825.16 |
| 4,916,607 | 4/1990 | Teraichi et al. | 364/200 |
| 4,947,397 | 8/1990 | Sobel et al. | 371/16.4 |
| 4,962,368 | 10/1990 | Dobrzanski et al. | 340/514 |
| 4,965,676 | 10/1990 | Ejiri et al. | 358/406 |
| 4,991,114 | 2/1991 | Kawamura et al. | 364/519 |
| 5,016,059 | 5/1991 | Smeiman | 355/308 |
| 5,048,078 | 9/1991 | Satomi et al. | 379/100 |
| 5,077,582 | 12/1991 | Kravette et al. | 355/206 |
| 5,084,875 | 1/1992 | Weinberger et al. | 371/291 |
| 5,196,944 | 3/1993 | Satake | 358/404 |
| 5,282,127 | 1/1994 | Mii | 355/206 |
| 5,303,005 | 4/1994 | Takano et al. | 355/202 |

EQUIPMENT CONTROL UNIT

This application is a continuation-in-part of application Ser. No. 07/869,182 filed Apr. 16, 1992, now abandoned.

BACKGROUND OF THE INVENTION

1. Field of the Invention

The present invention relates to an equipment control unit for use in providing centralized control for a plurality of equipment.

2. Related Background Art

There is a strong desire for a copying apparatus to have additional and higher functions, so that copying apparatus is becoming increasingly more complex in construction and function. Also, the number of copying apparatuses installed within one company is increasing. Thus, as described in U.S. Pat. No. 5,084,875, it is well known that in order to manage the use and operation, maintenance, and the appropriate and rapid repair of faults, the normal use conditions and the functional data of the copying apparatus are collected by a management department within the company or a special dealer for centralized control.

A copying apparatus has also been proposed in which by calling a specific external device with, for example, a telephone number to make the communication through a communication line, the transmission or reception of data can be made to the external device installed at the management department periodically or at any time.

However, when it was necessary to change or adjust the copying control data set onto the copying apparatus at its manufacture, a serviceman had to go to the installed site of the copying apparatus to change the setting of the copying control data, so that there was a problem that rapid measures could not be taken.

Also, when it was necessary to change the telephone number of a specific external device after the installation of the copying apparatus, the serviceman had to go to the copying apparatus to make the changed input operation, which resulted in time-consuming work.

Also, there was a problem that if the initial conditions to start the communication, for example, a partner's telephone number, a password, and an identification code (hereinafter referred to as ID) might be set unduly or improperly, the apparatus would communicate with an unauthorized or wrong destination so that the data would be wrongly transmitted or received to or from that destination.

SUMMARY OF THE INVENTION

An object of the present invention is to provide an equipment control unit which has overcome the above-mentioned problems.

It is another object of the invention to provide an improved equipment control unit.

Also, it is another object of the invention to provide an equipment control unit which allows the changed input of the data for controlling an equipment by a remote operation from a centralized control system.

It is another object of the invention to provide an equipment control unit with high security which permits the input of predetermined initial values with a specific operator, and disables communication with a wrong external device other than permitted one.

Other objects and characteristics of the present invention will be more clear from the following description and the drawings.

DESCRIPTION OF PREFERRED EMBODIMENTS

A copying apparatus according to the present invention will be described below.

Figure 1:
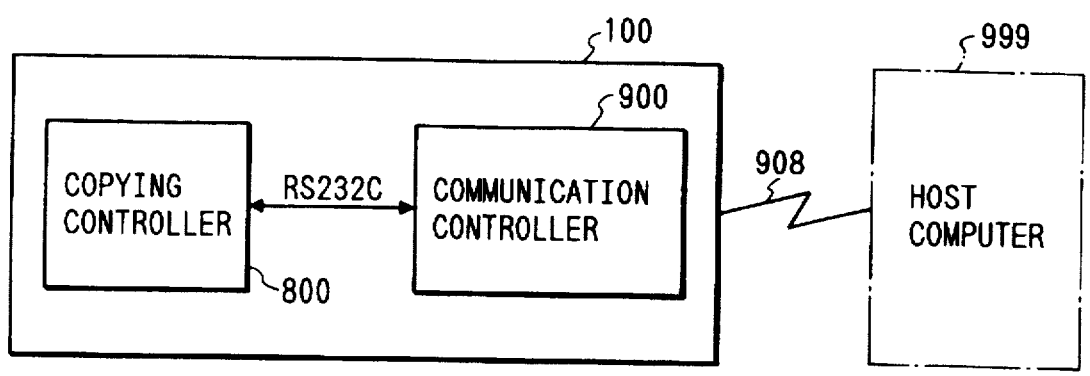
FIG. 1 is a block diagram showing a schematic configuration of the present invention.

FIG. 1 is a block diagram showing the configuration of the copying apparatus in one embodiment.

100 is a copying apparatus main component, 800 is a copy controller for controlling the copying operation, 900 is a communication controller (modem board) for transmitting or receiving the data through an external communication line, 908 is a public line which is the external communication line, and 999 is a host computer system which is an external device placed at a control section to control the copying apparatus 100.

Figure 2:
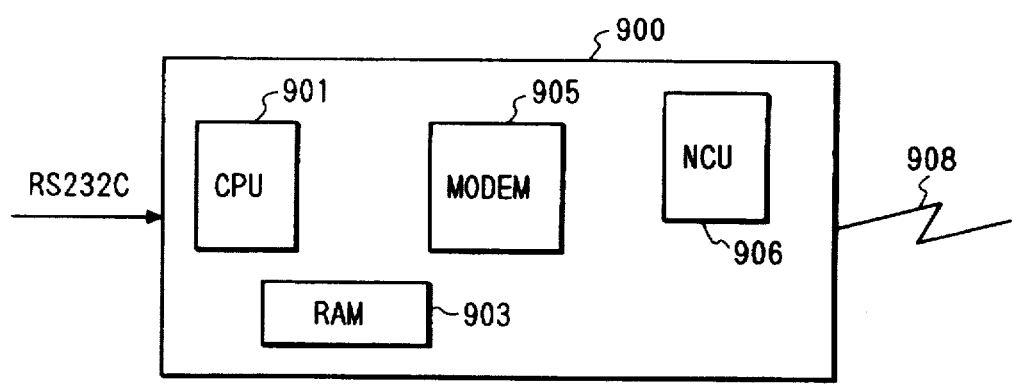
FIG. 2 is a configuration diagram of a communication controller 900.

FIG. 2 is a block diagram showing a main configuration of the communication controller 900.

901 is a central processing unit (hereinafter referred to as a CPU) for controlling the communication, 903 is a random access memory (RAM) for storing temporarily the communication data, 905 is a modulator/demodulator (MODEM) for modulating the digital communication data to be sent through the public line 908, and demodulating the data sent through the public line 908 into the digital communication data, and 906 is a network control unit(NCU). The copy controller 800 and the communication controller 900 with the above constitution allow the control for the copying operation of the copying apparatus 100, the storage of data, and the communication with the external device 999 via the external communication line 908.

The copy controller 800 and the communication controller 900 will be described below.

Figure 3:
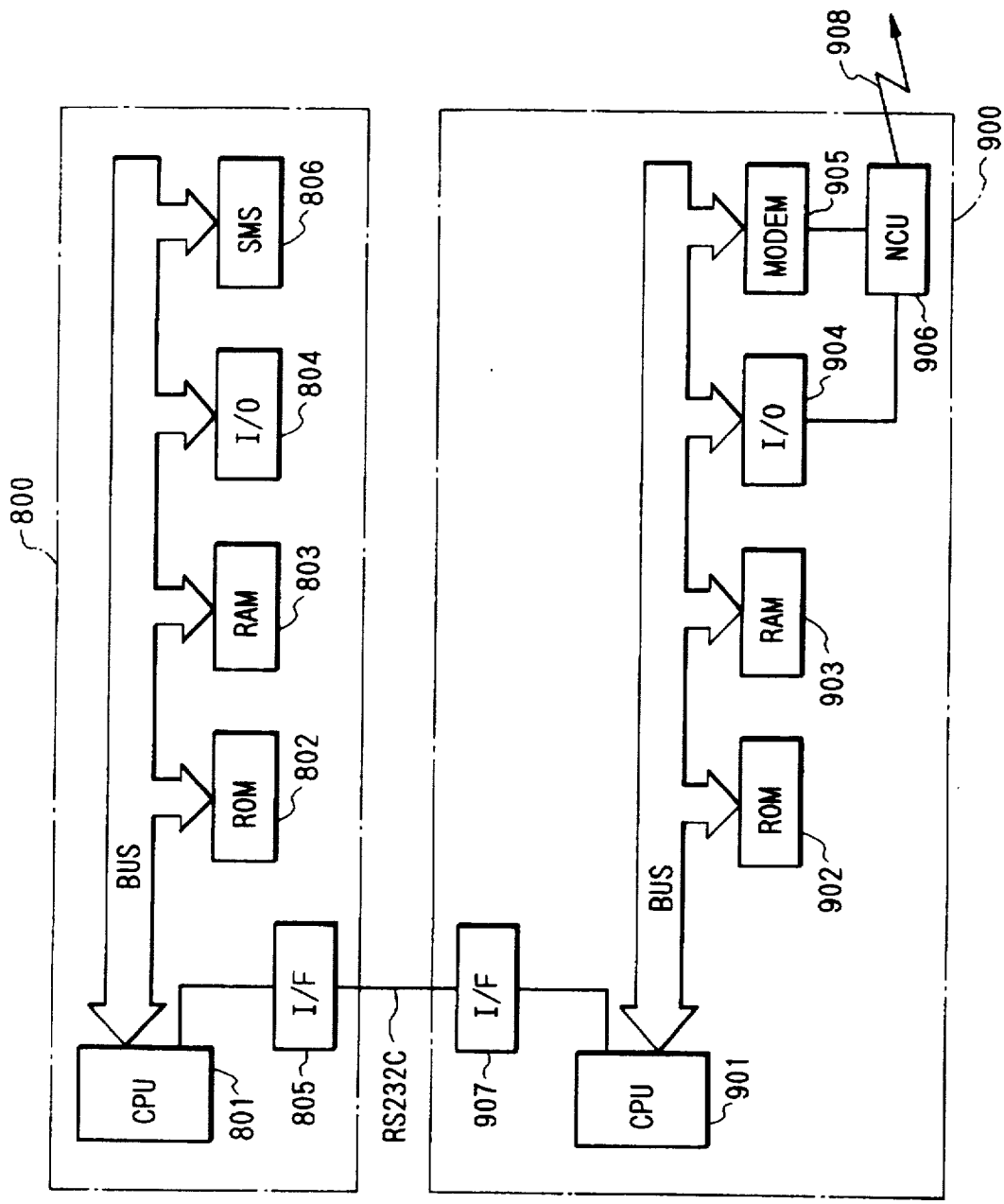
FIG. 3 is a block diagram of a copy controller 800 and the communication controller 900.

FIG. 3 is a block diagram showing the copy controller 800 and the communication controller 900.

801 is a central processing unit (hereinafter referred to as CPU) for controlling the whole copying apparatus, and 802 is a read-only memory (hereinafter referred to as ROM) for storing a control procedure (control program) of the copying apparatus main component (body) 100, CPU 801 being able to control each component connected via a bus in accordance with the control procedure stored in the ROM 802.

803 is a random access memory (hereinafter referred to as RAM) which is a main storage useful for storing the input data, or as a working storage area, in which the copying control data necessary for the copying operation is stored. Also, RAM 803 stores the connection control data such as the telephone number necessary to start the communication with the external device 999, password, or proper identification number (hereinafter referred to as ID number). Note that the connection control data stored herein can be rewritten through a signal from the CPU 801.

804 is an input/output IC for outputting a control signal of the CPU 801 to a load such as a main motor 113 and inputting a signal from a sensor for a fixing unit 122 and sending it to the CPU 801.

The communication controller 900 for making the communication control through the external communication line 908 is controlled by a CPU 901 provided internally. 902 is a read only memory (ROM) for storing communication control and connection procedure programs. And the copy controller 800 and the communication controller 900 of the copying apparatus main component 100 are connected via the RS-232C interfaces 805, 907, and if the data is transferred from the controller 800 of the copying apparatus main component 100 via the RS-232C interface 907, its transferred data is temporarily stored in the RAM 903 provided in the communication controller 900, and after the data transfer from the controller 800 of the copying apparatus main component has been completed, the CPU 901 controls a network control unit 906 (hereinafter referred to as NCU) to connect the communication line with the external device using the connection control data stored in connection data storing means RAM 803, and transfer the data to the external through the modem 905 and the NCU unit 906 after the line connection.

Also, when the data transfer is made from the external, its transfer data is temporarily stored in the RAM 903, and then transferred to the copy controller 800 of the copying apparatus main component 100 via the RS-232C interfaces 805, 907 upon a request from the copy controller 800.

Note that the copy controller 800 and the communication controller 900 transfer a signal for changing the copy control data received from the external device 999 to the RAM 803, as previously described. The CPU 801 controls the rewriting of the transferred copy control data.

Figure 4:
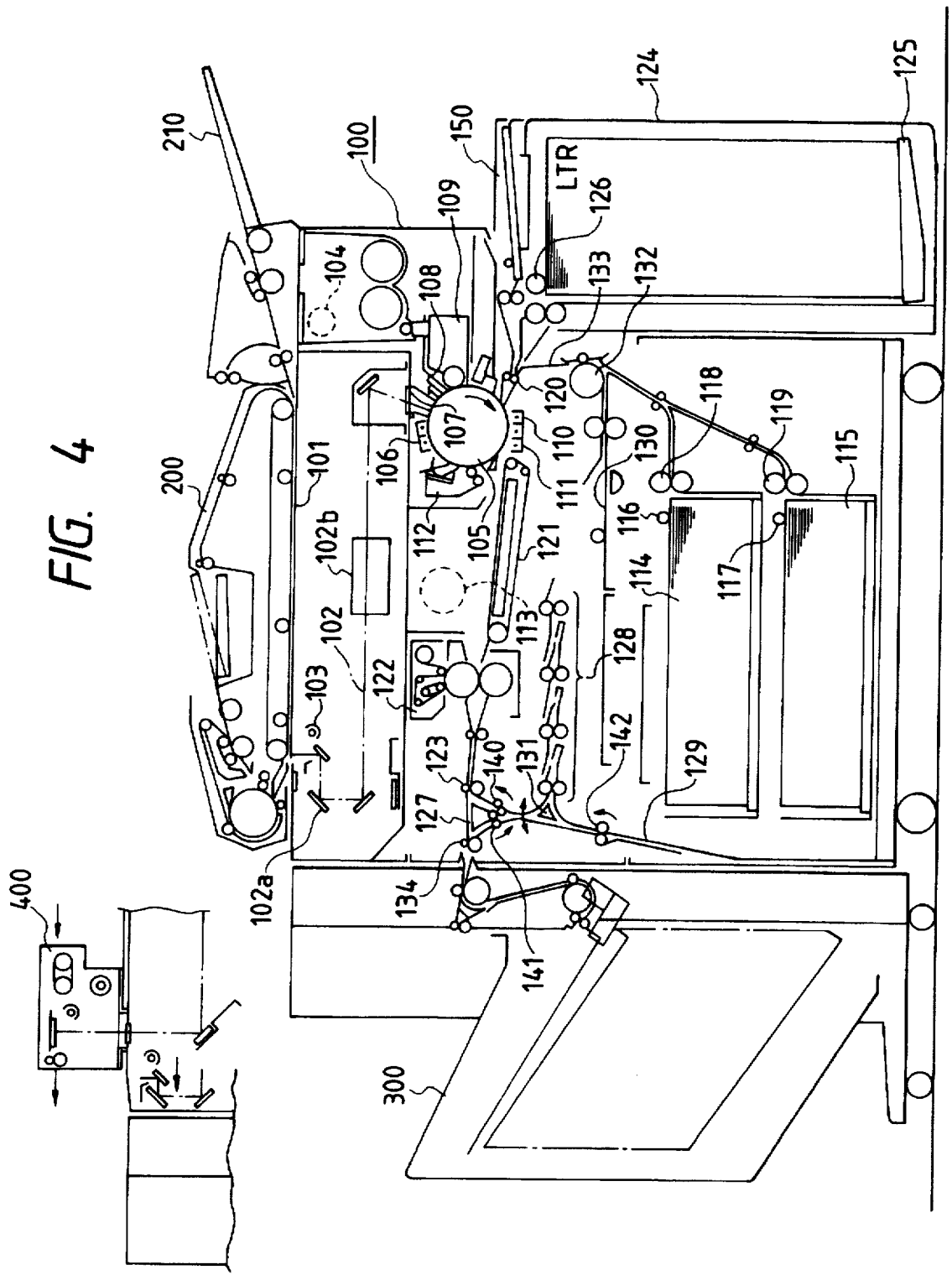
FIG. 4 is a cross-sectional view of a copying apparatus in one embodiment.

FIG. 4 is a cross-sectional view showing the constitution of the copying apparatus 100, of which the constitution and operation will be described with reference to the same figure.

100 is a copying apparatus main component, 200 is a repeatable automatic original feeder (hereinafter referred to as RDF), 300 is a sorter for sorting copied papers, 400 is an automatic computer form feeder (hereinafter referred to as CFF), in which the RDF 200, the sorter 300 and the CFF 400 as above mentioned may be used in any combination for the copying apparatus main component 100.

The constitution of the copying apparatus main component 100 will be described below.

In FIG. 4, 101 is an original board glass on which an original is laid, and 102 is an optical system for reading the original, composed of an exposure lamp 103 for illuminating the original, a scanning mirror 102a, a lens 102b, and a motor 104. The original is illuminated by the exposure lamp 103, while the scanning mirror 102a, the lens 102b and the exposure lamp 103 are being moved by the motor 104, and the reflected light from the original is led via the scanning mirror 102a and the lens 102b to a photosensitive drum 105.

Around the photosensitive drum 105, there are mounted a high voltage unit 106, a blank exposure unit 107, a voltage sensor 108, a developing processor 109, a transfer charger 110, a separation charger 11 and a cleaner 112, with which the photosensitive drum 105 can perform the image recording on a fed paper.

The photosensitive drum 105, which rotates in a direction of the arrow by a main motor 113, is corona charged with the high voltage unit 106, and if the reflected light from the original is applied through the optical unit 102, an electrostatic latent image is formed thereon. This electrostatic latent image is developed by the developing processor 109, and visualized as a toner image.

On the other hand, a transfer paper fed into the main component 100 by paper feed rollers 118, 119 after being separated from an upper cassette 114 or a lower cassette 115 by pickup rollers 116, 117 is timed with a resist roller 120, so that a leading edge of the toner image on the photosensitive drum 105 and a leading edge of the transfer paper may coincide, and then fed toward the photosensitive drum 105, the toner image on the photosensitive drum 105 being transferred to the transfer paper with the aid of the transfer charger 110. After this transfer, the transfer paper is separated from the photosensitive drum 105 by the separation charger 122 to be conveyed via a conveying belt 121 to a fixing unit 122, against which it is pressed and heated, for fixing the toner image, and then exhausted out of the copying apparatus main component 100 by an exhaust roller 123. Also, the photosensitive drum 105 is cleaned on its surface by the cleaner 112.

The copying apparatus main component 100 is equipped with a deck 124 capable of accommodating transfer papers as many as 4,000 sheets, for example. A lifter 125 of the deck 124 lifts in accordance with the amount of transfer papers so that the transfer paper always makes contact with the paper feed roller 126.

The transfer paper fed out of the exhaust roller 123 is led to either of the both face recording or multi recording side and the exhaust side by a paper exhaust flapper 127. Also, 128 is a lower conveying path for leading the transfer paper fed out of the exhaust roller 123, turned upside down via a reversal path, to a paper refeed tray 130.

131 is a multi-flapper for switching the passages for the both face recording and the multi-recording, and if this is turned left-hand, the transfer paper is directly led to the lower conveying path 128, rather than the reversal path 129. 132 is a paper feed roller for feeding the transfer paper through a passage 133 to the photosensitive drum 105. 134 is the exhaust roller, disposed near the paper exhaust flapper 127, for exhausting the transfer paper out of the apparatus as the paper exhaust flapper 127 is switched to the exhaust side.

When making double hyphen sided (both face copying) and the multi-recording (multi-copying), the paper exhaust flapper 127 is turned upward to store the copied transfer paper turned upside down via the reversal path 129 and conveyed via the lower conveying path 128 into the paper refeed tray 130. The multi-flapper 131 is turned right-hand at the both face recording, and left-hand at the multi-recording. At the back face recording or the multi-recording, which is performed next, the transfer paper stored in the paper refeed tray 130 is led through the passage 133 via the paper feed roller 132 to the resist roller 120, one sheet at a time from the bottom side.

When the transfer paper is exhausted in a reversed form out of the copying apparatus main component 100, the paper exhaust flapper 127 is raised upward, and the flapper 131 is turned right-hand, in which the copied transfer paper is fed to the conveying path 129 side to be conveyed to a second feed roller 141 side by a reversal roller 142 after a trailing edge of the transfer paper has passed through a first feed roller 140, and exhausted by the exhaust roller 134, with the transfer paper turned upside down.

Next, an operation panel will be described below.

Figure 5:
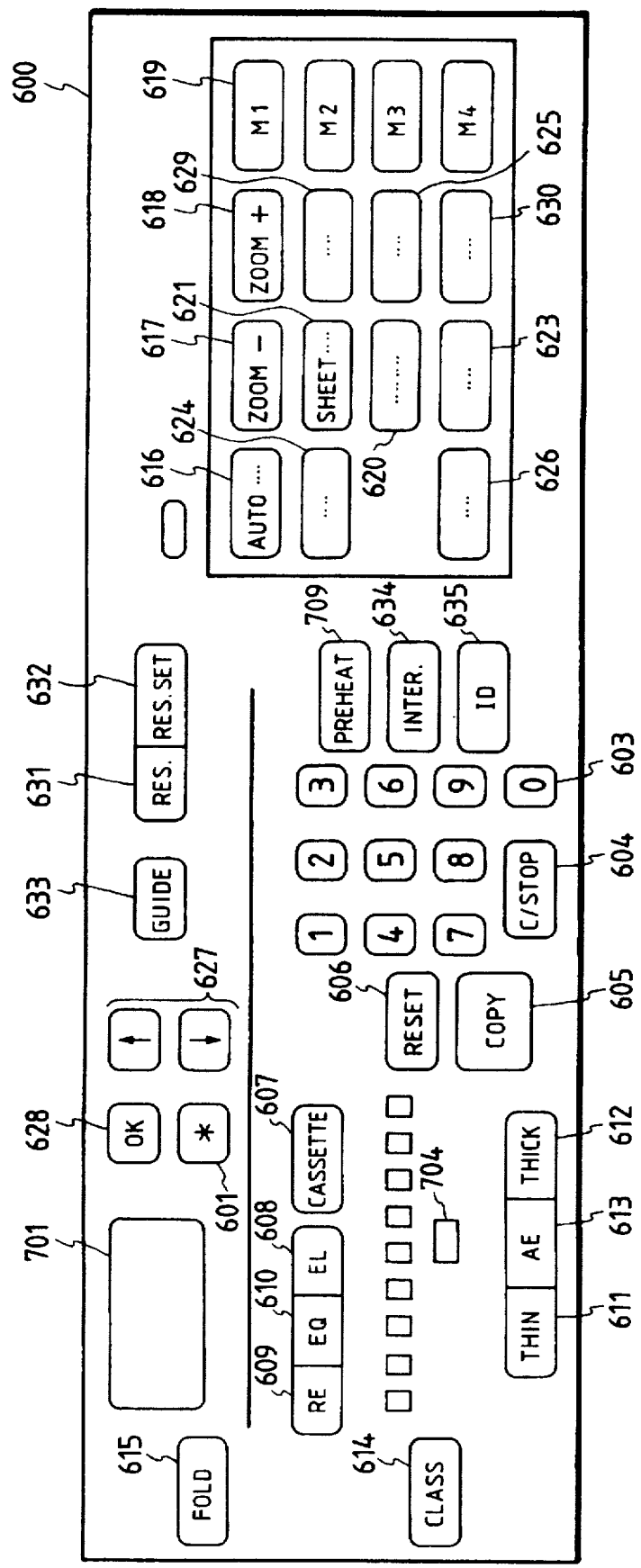
FIG. 5 is an external view of an operation panel in the embodiment.

FIG. 5 is an external view showing an example of the operation panel 600 equipped in the copying apparatus main component 100.

601 is an asterisk (*) key which is used by the operator (user) in a setting mode for setting the amount of binding margin or the size of original border erasing. 627 is a cursor key for use in selecting the set items in the setting mode. 628 is an OK key for use in determining the set contents in the setting mode.

606 is an automatic reset key which is depressed to return to a normal mode. This automatic reset key 606 is also depressed when returning from an automatic shut-off state to the normal mode.

605 is a copy start key which is depressed to start the copy.

604 is a clear/stop key having a feature of the clear key during the wait (standby) and the stop key during the copying. This clear/stop key 604 is depressed to clear the set number of copied sheets or stop the continuous copying. And after the copy executed at the time of depressing is terminated, the copying operation is stopped.

603 is a ten key which is depressed to set the number of copied sheets. Also, it is used to depress the asterisk (*) mode. 619 is a memory key which allows the registration of the mode frequently used by the user. Here, four modes of M1 to M4 can be registered.

611 and 612 are copy density keys which are depressed to adjust the copy density manually. 613 is an AE key which is depressed to adjust automatically the copy density in accordance with the density of an original, or switch the density adjustment to a manual mode by clearing the AE (automatic exposure) mode.

607 is a copy paper selection key which is depressed to select an upper stage paper lifter 119, a lower stage paper lifter 115, a paper deck 124, and a multi manual insertion 150. When the original is laid on the RDF 300, APS (automatic paper cassette selection) can be selected by the copy paper selection key 607. When the APS is selected, the cassette having the same size as the original is automatically selected.

610 is an equal magnification key which is depressed to copy at the equal magnification (original size). 616 is an automatic variable magnification key which is depressed to specify the automatic reduction or enlargement of an original image in accordance with the size of specified transfer paper.

626 is a both face key which is depressed to take the both face copy from the one-side original, the both face copy from the both face original, or the one-side copy from the both face original. 625 is a binding margin key with which a binding margin having a specified length can be created on the left side of the transfer paper. 624 is a photograph key which is depressed to copy the photograph original. 623 is a multi key which is depressed to create (synthesize) images from two originals on the same side of the transfer paper.

620 is an original border erasing key which is depressed to erase a border for the original of fixed size, which is set by the asterisk key 601. 621 is a sheet border erasing key which is depressed to erase the border of the original in accordance with the size of a copy paper.

629 is a cover mode setting key which is used to create a front cover and a back cover, and to insert the fly leaf. 630 is a page continuous copy key which is used to continuously copy the left and right sides of an opened book.

614 is a paper exhaust method selection key for selecting the method of exhausting the paper among the stable sort, sort and group modes, in which when a stable sorter 300 is connected, it is possible to select a staple sort mode, a sort mode or a group mode for a recording sheet, or clear the selection mode.

631 is a reservation key which is used to start the setting of the copy mode for a reserved original laid on a reservation tray 210, or clear the setting of reservation. 632 is a reservation setting key which is used as a deterministic key in setting the reservation mode.

633 is a guide key which is used to display a message for explaining the function corresponding to each key on a message display 701.

701 is the message display for displaying the information as to the copy and the communication, which is a liquid crystal display (LD) for displaying a character or figure with 96×129 dots. For example, it displays the number of copied sheets set by the ten key 603, the copy magnification set by the fixed form variable keys 608, 609, the equal magnification key 610 or the zoom keys 617, 618, the sheet size selected by the copy sheet selection key 607, a message indicating the condition of the copy apparatus main component 100, a guide message indicating the operation procedure, and the set contents in a variety of modes.

704 is an AE indicator which lights up when the AE (automatic exposure) is selected by the AE key 613. 709 is a preheat indicator which lights up in a preheat condition.

When the RDF 200 is used in the normal mode, the setting is such that the copy sheet number is one, with the density of AE mode, the automatic sheet selection, the equal magnification and the one-side copy from the one-side original. When the RDF 200 is not used in the normal mode, the setting is such that the copy sheet number is one, with the density of manual mode, the equal magnification and the one-side copy from the one-side original. A difference between when the RDF 200 is used and when it is not used can be determined depending on whether the original is set on the RDF 200.

The change of a characteristic copy control data will be described below.

In the copying operation, there are some cases where the operation timing of each control portion is different depending on the copying apparatus, and therefore is required to change. For example, there are operation adjusting values such as the brake time to stop the optical system, or the timing at which the leading edge of the resist roller is adjusted. These copy control data values are stored in the RAM 803, backed up by a power source, in view of the easy adjustment and change, so that the copy operation is performed based on the copy control data.

However, due to a change with the passage of time for each control portion or the use conditions of the copying apparatus 100, the copy control data values set when manufactured become often inappropriate.

In the first example, the copy control data, e.g., the adjusting values of the operation, can be rewritten through the communication from the external device 999 installed on the management department.

Figure 6:
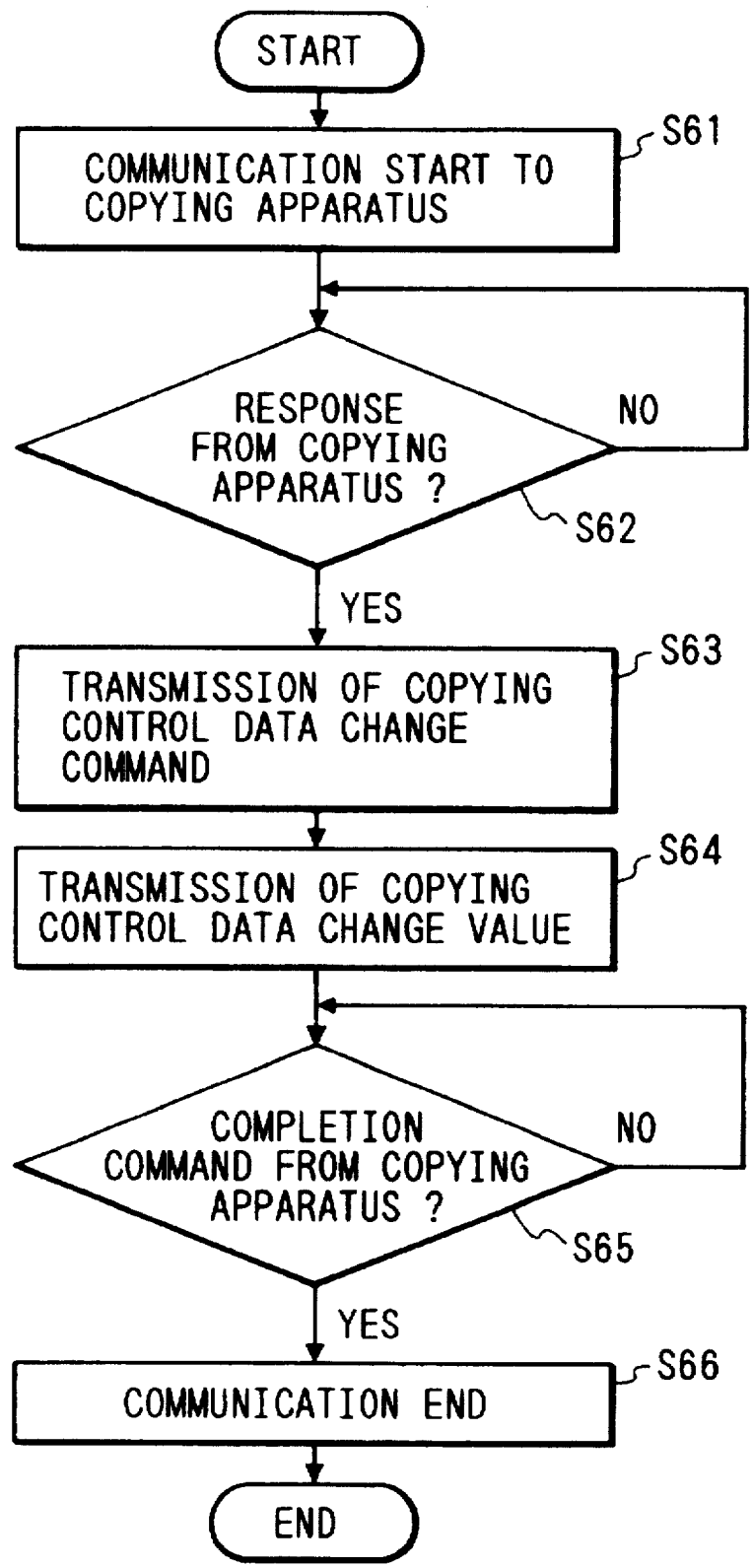
FIG. 6 is a flowchart of an external device in a first example.

First, the control of the external device 999 on the management department side in order to make the change will be described with reference to the flowchart as shown in FIG. 6.

At step S61, the communication is started from the external device 999 on the management department side to the copying apparatus 100 for changing the copy control data. At step S62, the operation waits for a response from the copying apparatus 100. If there is a response, the operation proceeds to step S63, where a command indicating that the copy control data is changed is transmitted. And at step S64, the data for changing the copy control data is transmitted.

At step S65, the operation waits for a completion command indicating that the rewrite of the data has been completely executed to be sent from the copying apparatus. If the completion command is received, the operation proceeds to step S66 to terminate the communication, and then the change procedure is ended.

Figure 7:
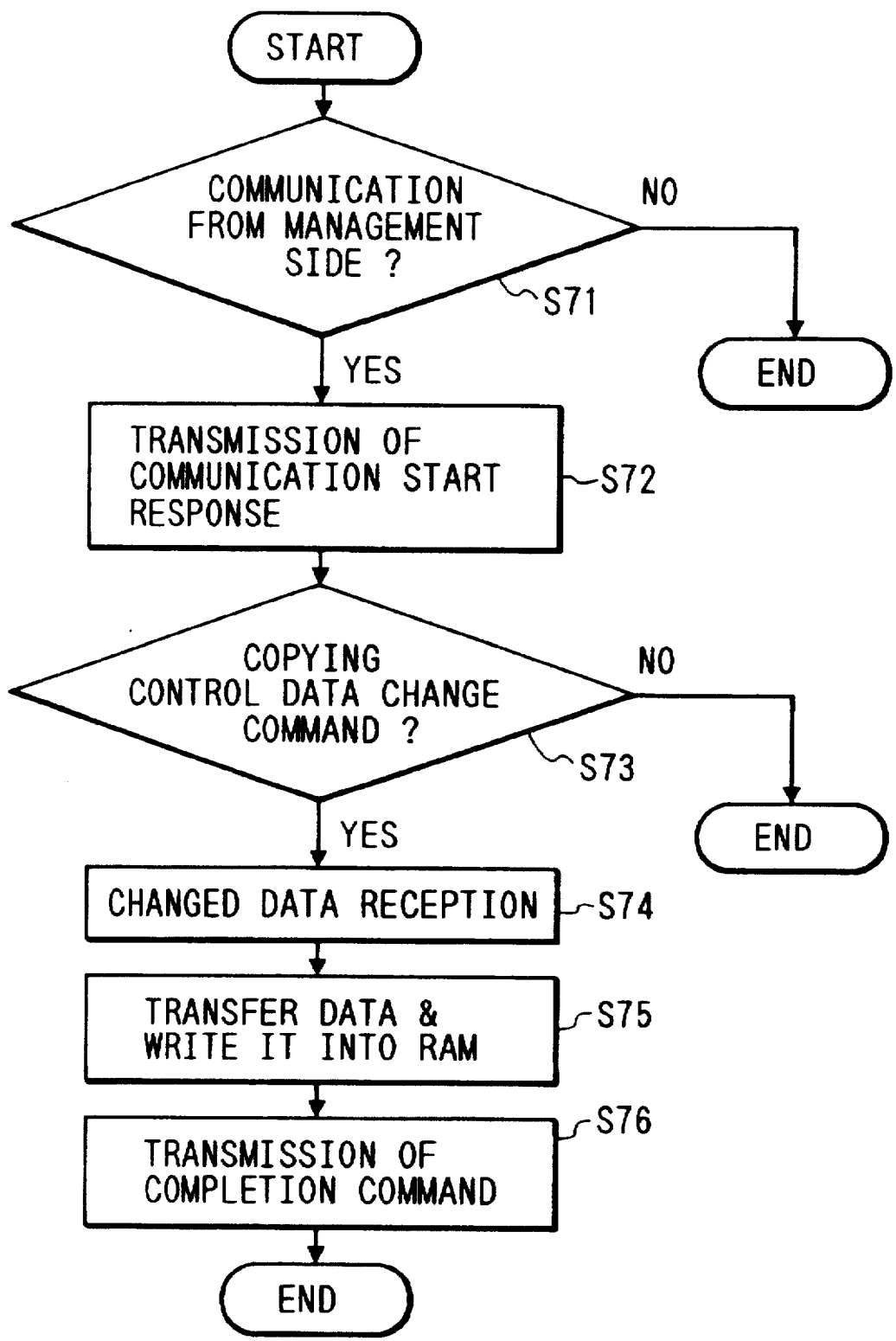
FIG. 7 is a flowchart for changing the connection control data in the first example.

Next, the control for changing the copy control data on the copying apparatus 100 side will be described below with reference to the flowchart as shown in FIG. 7.

At step S71, a check is made to determine whether the received communication is started from the management department side. If it is started from the external device 999 on the management department side, the operation proceeds to step S72, where a response indicating that the communication start is detected is transmitted.

At step S73, the received command is checked. If it is a command for changing the copy control data, the operation proceeds to step S74, where the data for changing the copy control data is received, and then to step S75, where the received changed data is written via the CPU 901, the I/F 907, the I/F 805 and the CPU 801 into the RAM 803 in which the copy control data is stored. If the deletion of previous copy control data and the writing of new copy control data have been terminated, a completion command is transmitted to the external device at step S76, and the rewrite operation is ended.

With the above operation control, it is possible to change the copy control data stored in the copying apparatus through a remote operation from the external device.

In the copying apparatus, there are several portions for which the operation can be selected depending on a user's choice. For example, an operation of specifying whether or not a buzzer sound is issued. A second example will be described in which the change from a user's request can be performed with a remote operation from the external device.

Figure 8:
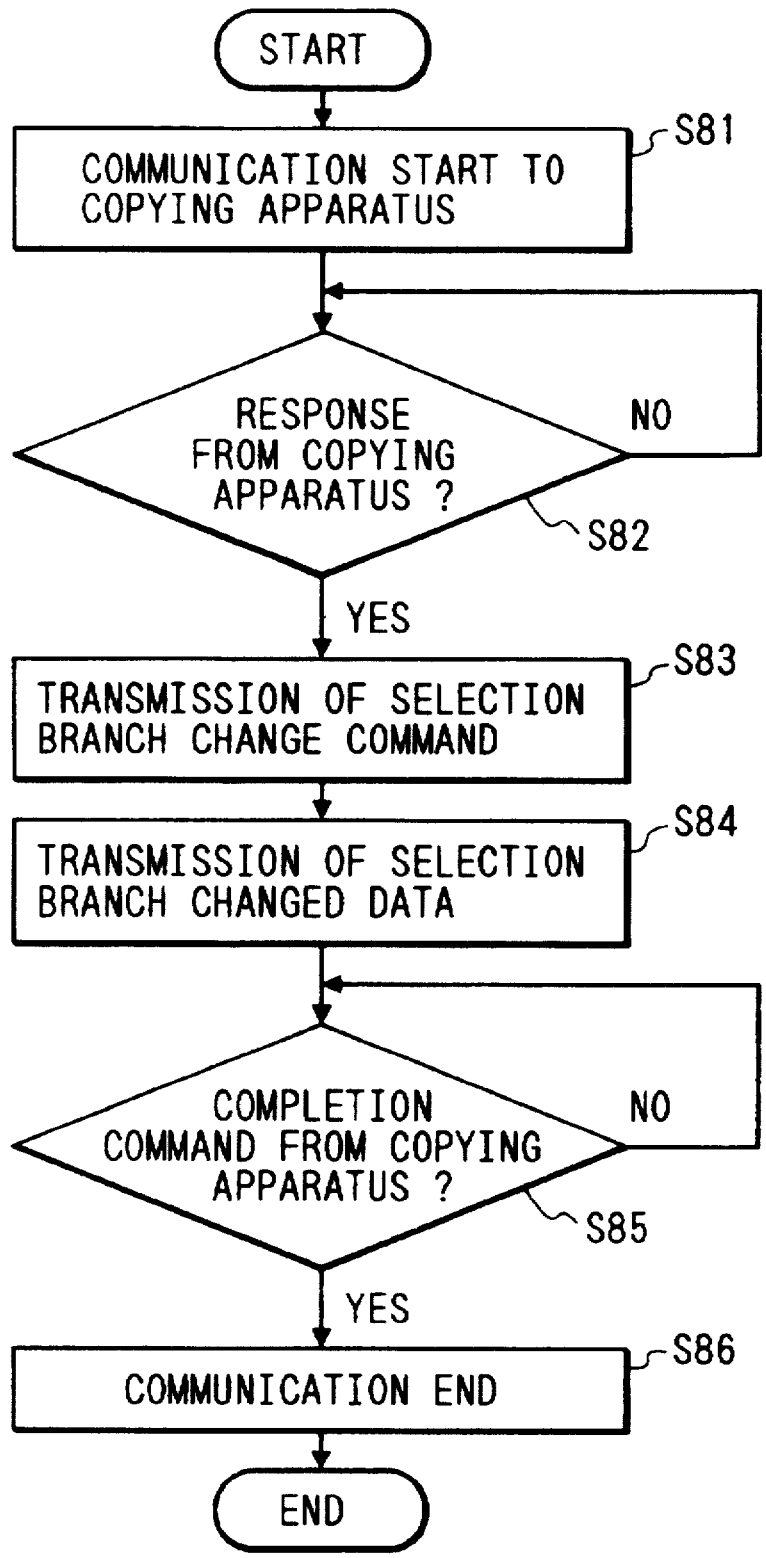
FIG. 8 is a flowchart of an external device in a second example.

First, the control of the external device will be described with reference to the flowchart as shown in FIG. 8. At step S81, the communication is started from the external device 999 on the management department side to the copying apparatus 100 for changing. At step S82, the operation waits for a response from the copying apparatus 100. If there is a response, the operation proceeds to step S83, where a command indicating that the selection branch in the copy control data is changed is transmitted. And at step S84, the data for changing the selection branch is transmitted.

At step S85, the operation waits for a completion command indicating that the change of the selection branch data has been completely executed to be sent from the copying apparatus 100. If the completion command is received, the operation proceeds to step S86 to terminate the communication, and then the change procedure is ended.

Figure 9:
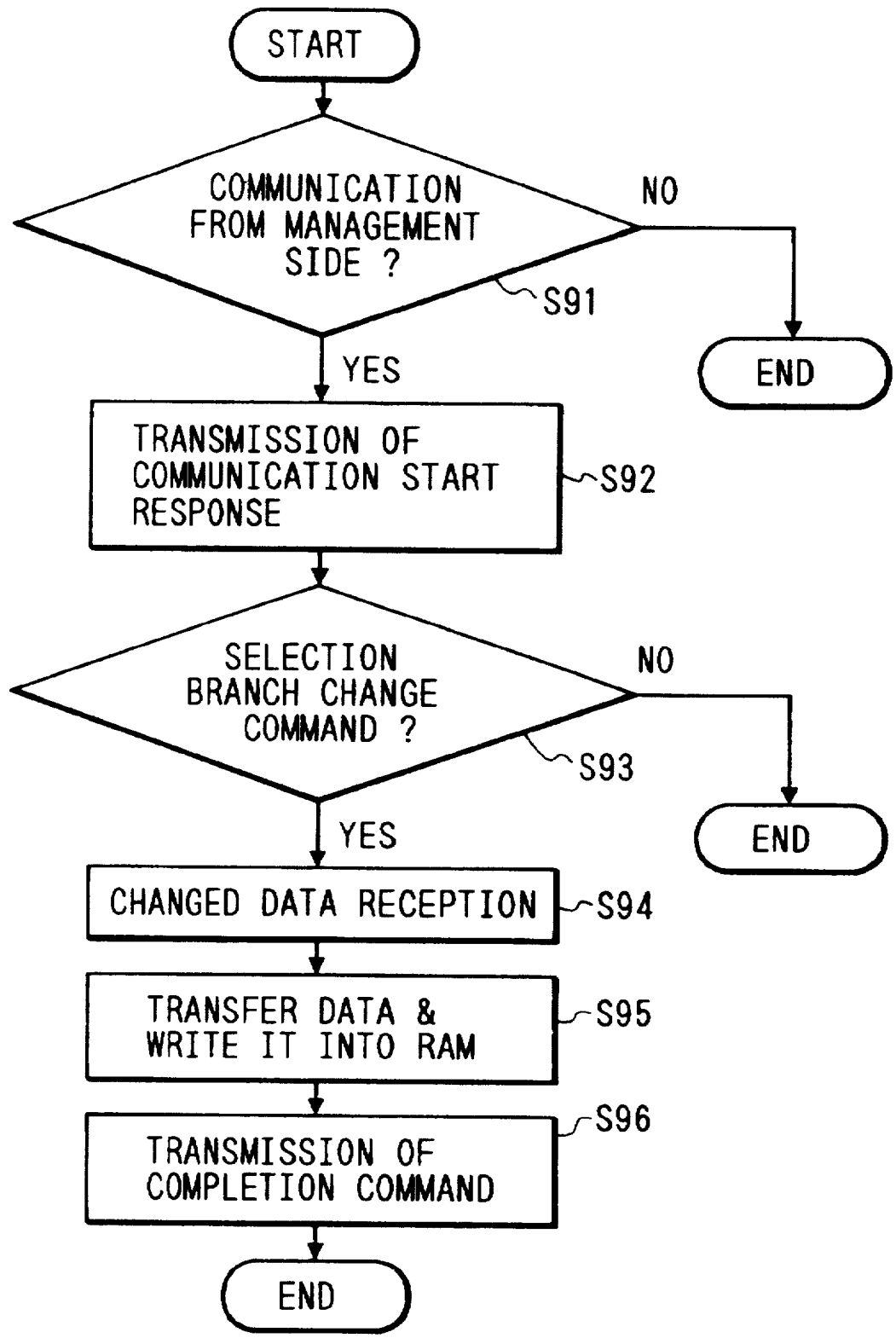
FIG. 9 is a flowchart for changing the connection control data in the second example.

Next, the control for changing the selection value in the copy control data on the copying apparatus 100 side will be described below with reference to the flowchart as shown in FIG. 9.

At step S91, a check is made to determine whether the communication is started from the external device 999 on the management department side. If it is started, the operation proceeds to step S92, where a response indicating that the communication start is detected is transmitted to the external device 999.

At step S93, the received command is checked. If it is a command for changing the selection branch data in the copy control data, the operation proceeds to step S94, where the data is received, and then to step S75, where the received data is written via the CPU 901, the I/F 907, the I/F 805 and the CPU 801 into the RAM 803 in which the copy control data is stored. If the deletion of previous data and the writing of new data have been terminated, a completion command is transmitted to the external device 999 at step S96, and the operation is ended.

With the above operation control, it is possible to change the selection branch in the copy control data through the remote operation from the external device 999 on the management department side.

It is sometimes necessary to clear the data in a copy number counter or change it to a specific value in order to manage the copying apparatus.

A third example will be described below in which the copy number counter value can be changed with the remote operation.

Figure 10:
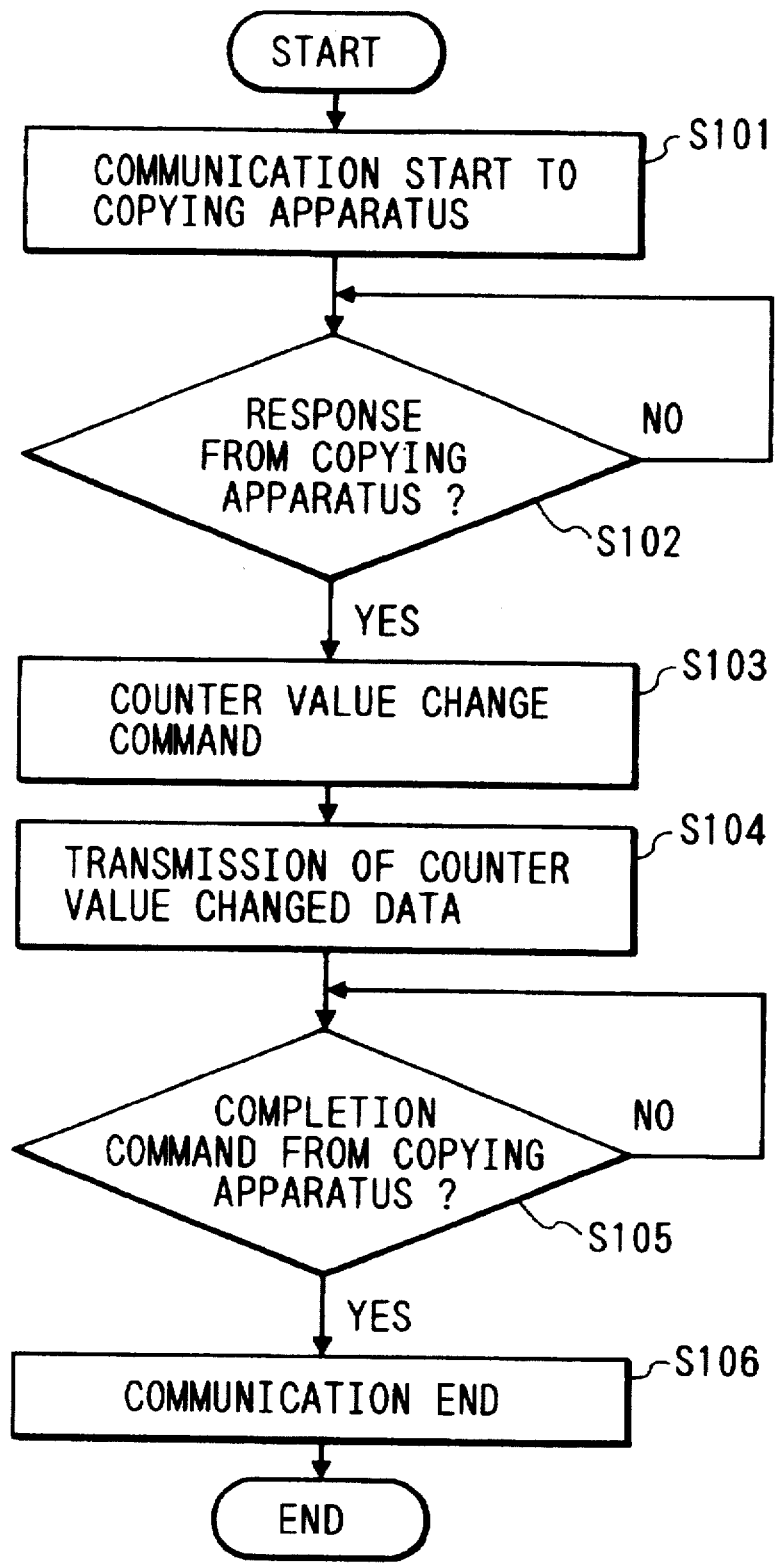
FIG. 10 is a flowchart of an external device in a third example.

FIG. 10 is a flowchart of the external device 999 in the third example.

At step S101, the communication is started from the external device 999 on the management department side to the copying apparatus 100 for changing. At step S102, the operation waits for a response from the copying apparatus 100. If there is a response, the operation proceeds to step S103, where a command indicating that the counter value is changed is transmitted. And at step S84, the data for changing the counter value is transmitted.

At step S105, the operation waits for a completion command indicating that the change of the counter value data has been completely executed to be sent from the copying apparatus 100. If the completion command is received, the operation proceeds to step S106 to terminate the communication, and then the change procedure is ended.

Figure 11:
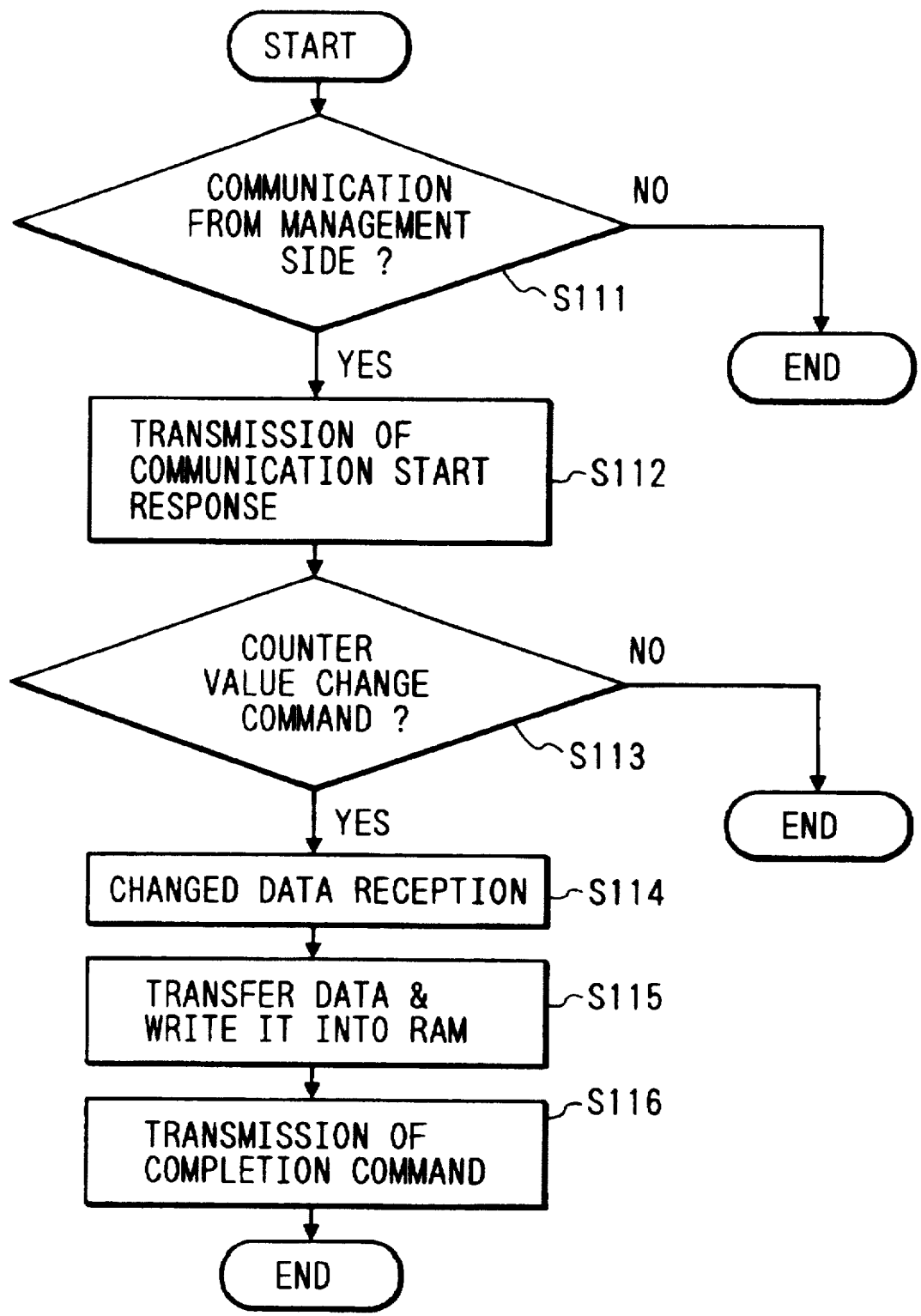
FIG. 11 is a flowchart for changing the connection control data in the third example.

Next, the control for changing the counter value data on the copying apparatus 100 side will be described below with reference to the flowchart as shown in FIG. 11.

At step S111, a check is made to determine whether the communication is started from the external device 999 on the management department side. If the communication is started, the operation proceeds to step S112, where a response indicating that the communication start is detected is transmitted to the external device 999.

At step S113, the received command is checked. If it is a command for changing the copy number counter value, the operation proceeds to step S114, where the counter value change data is received, and then to step S115, where the received data is written via the CPU 901, the I/F 907, the I/F 805 and the CPU 801 into the RAM 803 in which the control data is stored. If the deletion of previous data and the writing of new data have been terminated, a completion command is transmitted to the external device 999 at step S116, and the operation is ended.

With the above operation control, it is possible to rewrite the copy number counter value through the remote operation from the external device 999.

In this way, copy control means makes it possible to perform the copy operation with the copy control data stored in control data storing means, and transmit or receive the data by connecting the communication line to the external device via communication control means.

And when the communication control means receives the data for changing the copy control data from the external device, transfer means transfers the received data from the external device to control data storing means to replace the copy control data stored in the control data storing means with the transferred copy control data, and thereafter, the copy operation can be executed under the control of the copy control data newly stored.

As above described, since the stored connection control data necessary for the copy operation can be rewritten with the remote operation from the external device, it is unnecessary for the serviceman to repair to the site to change the settings, and it is possible to rapidly deal with a user's request of rewriting the connection control data, if any.

A fourth example will be described below in which the connection control data for starting the transmission and reception with the external device can be changed.

To start the communication, there are two methods in which the copying apparatus is called from the external side such as the management department, and the external side such as the management department is called from the copying apparatus side.

With this example, when the call number is required to change due to the change of the management department place or the line, it is possible to change the necessary connection control data without any serviceman repairing to the site of the copying apparatus.

Figure 12:
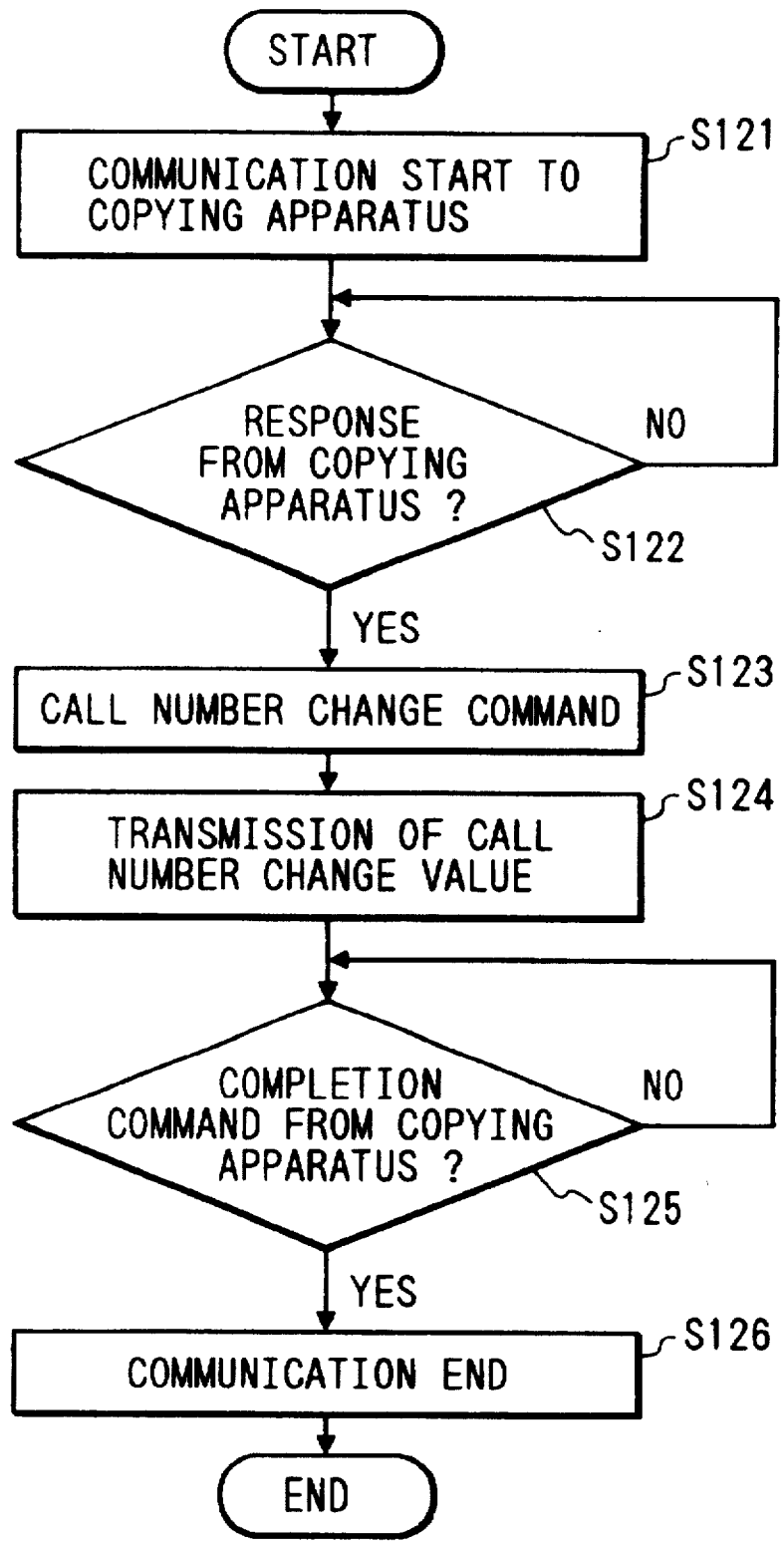
FIG. 12 is a flowchart of an external device in a fourth example.

First, the control of the external device on the management department side for changing will be described. FIG. 12 is a flowchart of the control for the external device 999 for changing the connection control data which is stored in the copying apparatus 100.

At step S121, the communication is started from the external device 999 to the copying apparatus 100 to be changed. At step S122, the operation waits for a response from the copying apparatus 100. If there is a response, the operation proceeds to step S123, where a command indicating that the call number in the connection control data is changed is transmitted. And at step S124, the data for changing the call number is transmitted.

At step S125, the operation waits for a completion command indicating that the change of the stored call number data has been completely executed to be sent from the copying apparatus 100. If the completion command is received, the operation proceeds to step S126 to terminate the communication, and then the change procedure is ended.

Figure 13:
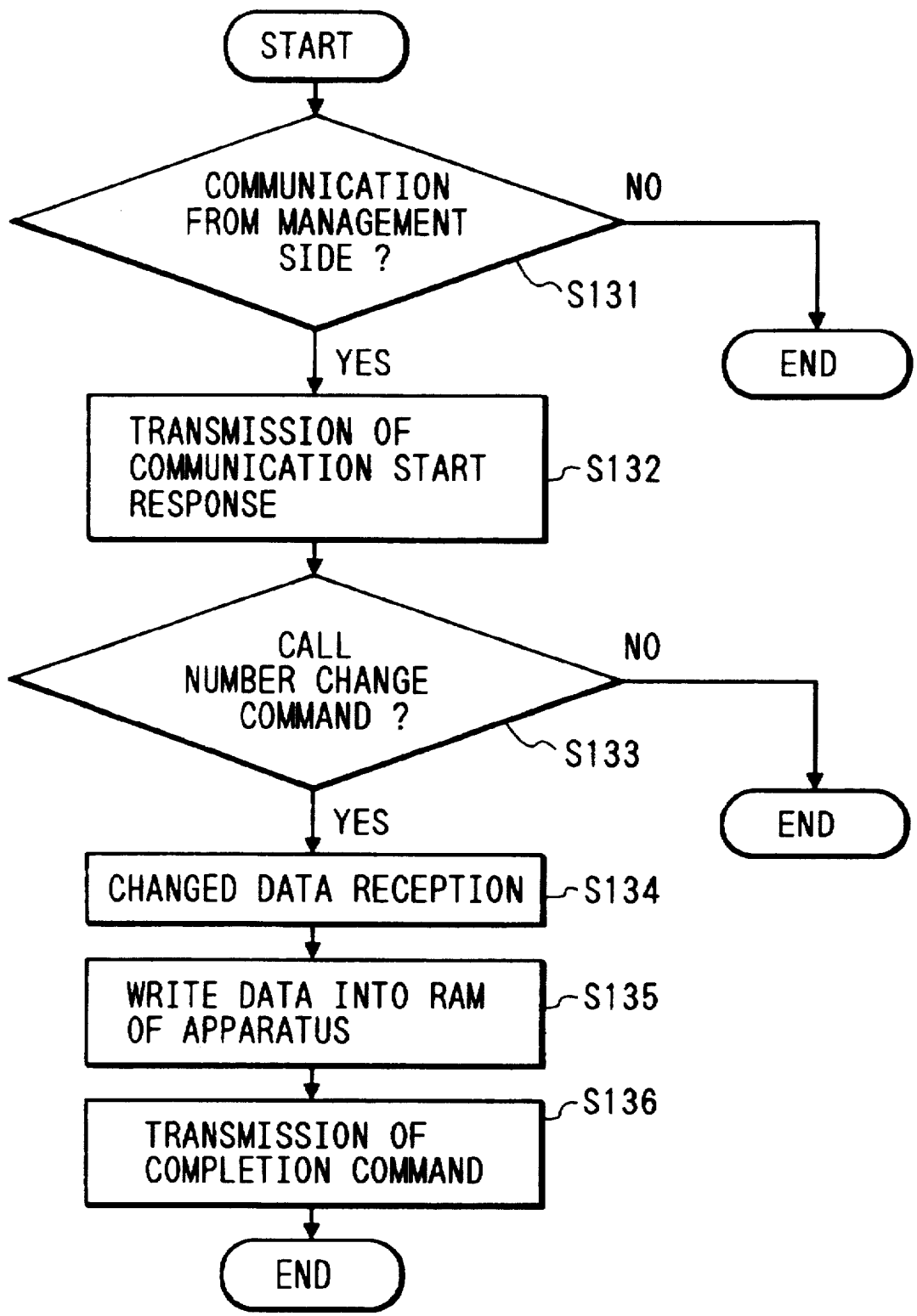
FIG. 13 is a flowchart for changing the connection control data in the fourth example.

Next, the control for changing the connection control data on the copying apparatus 100 side will be described below with reference to the flowchart of FIG. 13.

At step S131, a check is made to determine whether the communication is started from the external device 999 side. If the communication is started, the operation proceeds to step S132, where a response indicating that the communication start is detected is transmitted to the external device 999.

At step S133, the received command is checked. If it is a command for changing the call number, the operation proceeds to step S134, where the telephone number data in the connection control data is received, and then to step S135, where the received data is written via the CPU 901, the I/F 907, the I/F 805 and the CPU 801 into the RAM 803 in which the connection control data is stored. If the deletion of previous data and the writing of new data have been terminated, a completion command is transmitted to the external device 999 at step S136, and the operation is ended.

With the above operation control, it is possible to change the telephone call number in the connection control data stored in the copying apparatus through the remote operation from the external device.

A fifth example will be described below which can be usable when it is necessary to change a password for the security.

Figure 14:
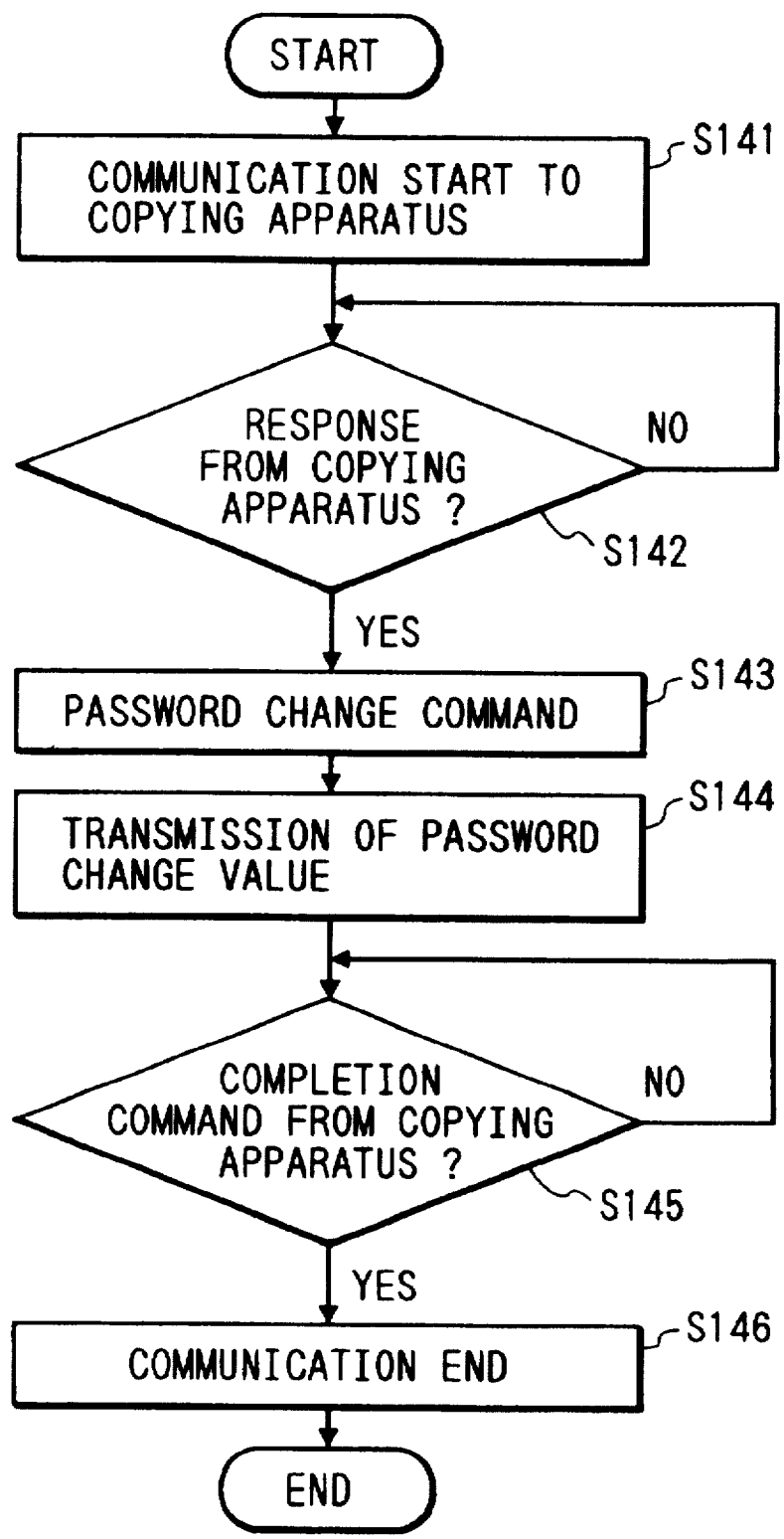
FIG. 14 is a flowchart of an external device in a fifth example.

FIG. 14 is a flowchart of the control for the external device 999 in the fifth example.

At step S141, the communication is started from the external device 999 on the management department side to the copying apparatus 100 to be changed. At step S142, the operation waits for a response from the copying apparatus 100. If there is a response, the operation proceeds to step S143, where a command indicating that the password in the connection control data is changed is transmitted. And at step S144, the data for changing the password is transmitted.

At step S145, the operation waits for a completion command indicating that the change of the stored password has been completely executed to be sent from the copying apparatus 100. If the completion command is received, the operation proceeds to step S146 to terminate the communication, and then the change procedure is ended.

Figure 15:
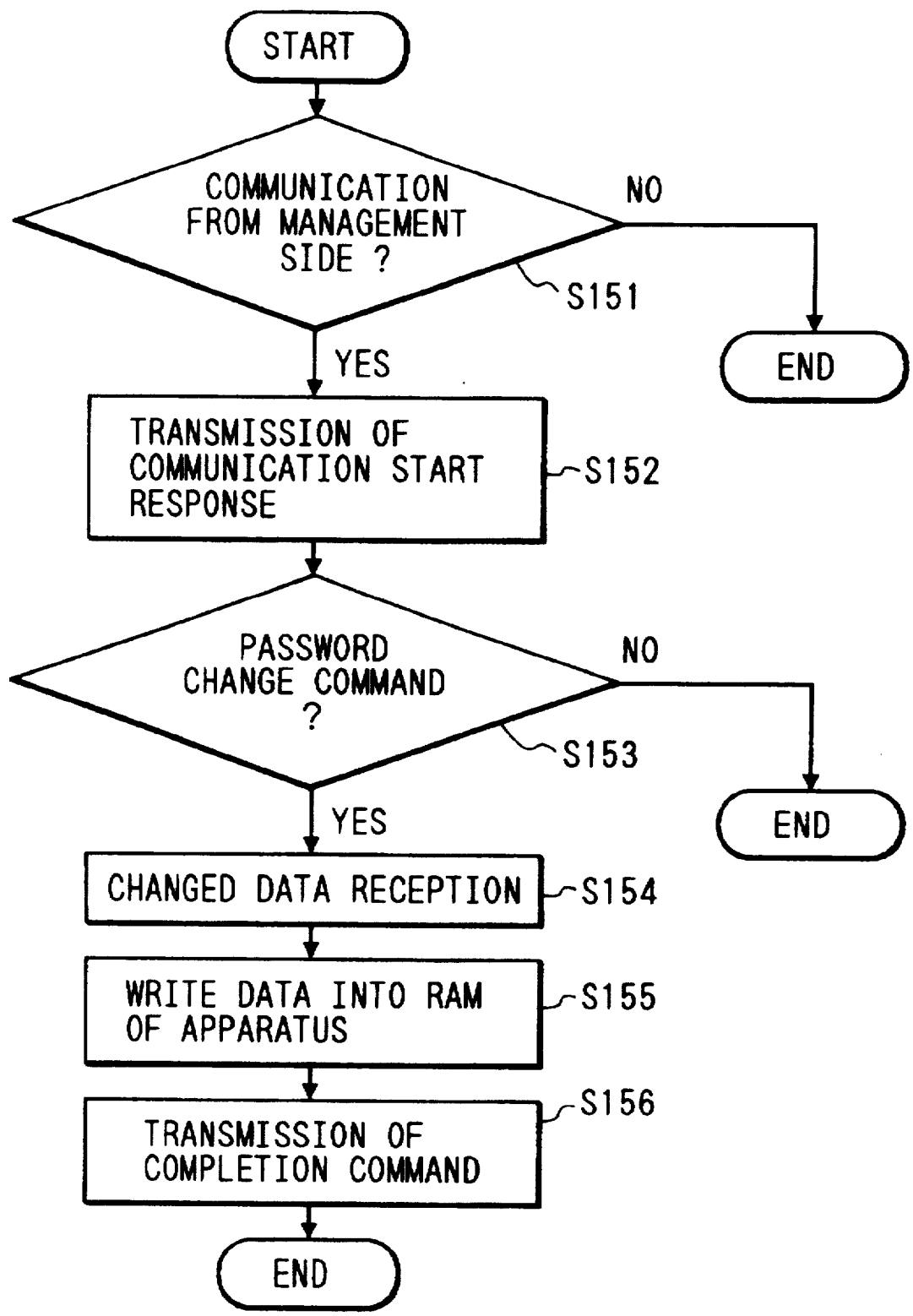
FIG. 15 is a flowchart for changing the connection control data change in the fifth example.

Next, the control for changing the connection control data on the copying apparatus 100 side in the fifth example will be described below with reference to the flowchart of FIG. 15.

At step S151, a check is made to determine whether the communication is started from the external device side. If the communication is started, the operation proceeds to step S152, where a response indicating that the communication start is detected is transmitted to the external device.

At step S153, the received command is checked. If it is a command for changing the password, the operation proceeds to step S154, where the password data in the connection control data is received, and then to step S155, where the received data is written via the CPU 901, the I/F 907, the I/F 805 and the CPU 801 into the RAM 803 in which the connection control data is stored. If the deletion of previous data and the writing of new data have been terminated, a completion command is transmitted to the external device 999 at step S156, and the operation is ended.

With the above operation control, it is possible to change the password in the connection control data stored in the copying apparatus through the remote operation from the external device.

A sixth example will be described below in which when the user of the copying apparatus is changed, the ID number of the copying apparatus can be changed.

Figure 16:
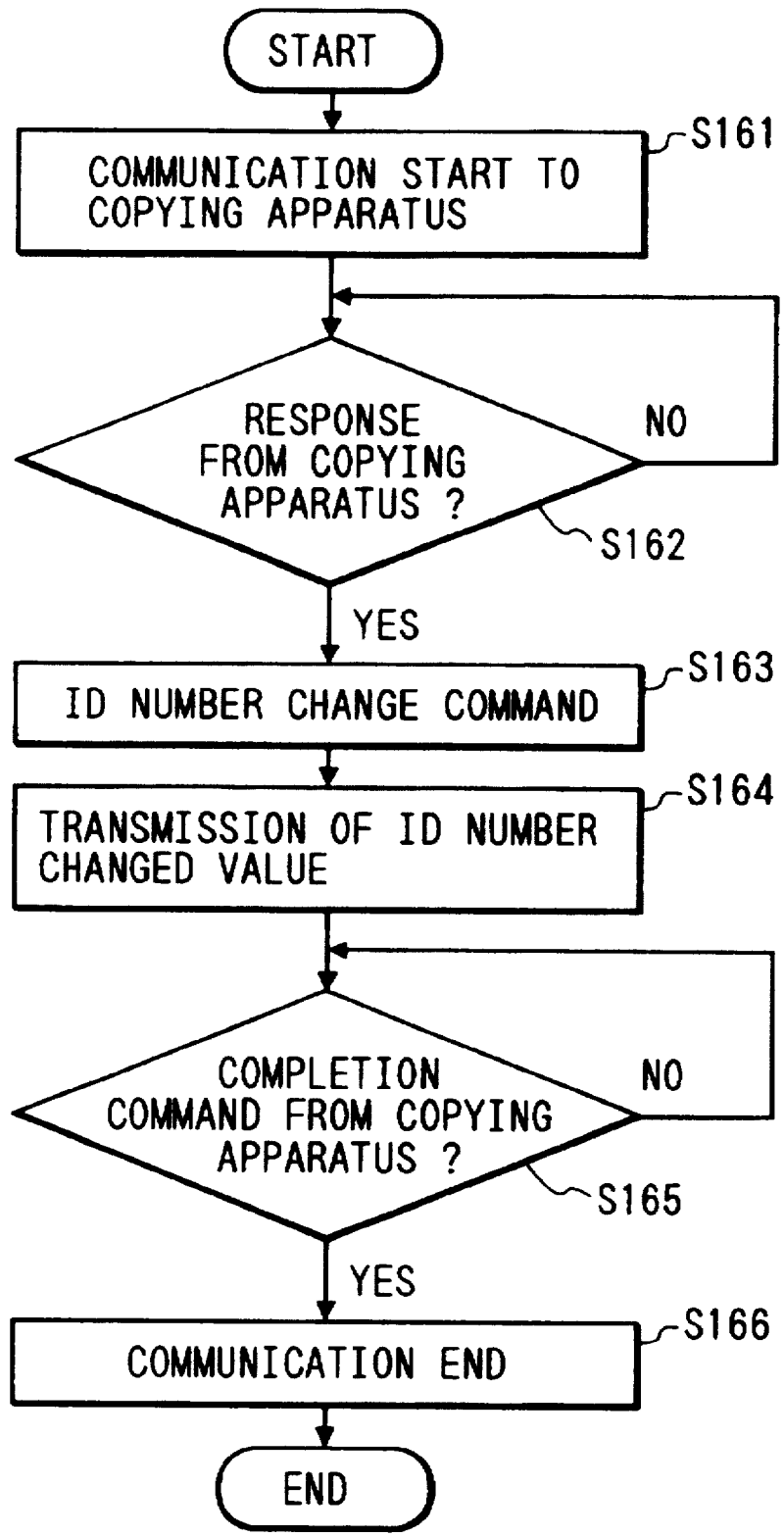
FIG. 16 is a flowchart of an external device in a sixth example.

FIG. 16 is a flowchart of the control for the external device 999 in the sixth example.

At step S161, the communication is started from the external device 999 on the management department side to the copying apparatus 100 to be changed. At step S162, the operation waits for a response from the copying apparatus 100. If there is a response, the operation proceeds to step S163, where a command indicating that the ID number in the connection control data is changed is transmitted. And at step S164, the data for changing the ID number is transmitted.

At step S165, the operation waits for a completion command indicating that the change of the ID number has been completely executed to be sent from the copying apparatus 100. If the completion command is received, the operation proceeds to step S165 to terminate the communication, and then the change procedure is ended.

Figure 17:
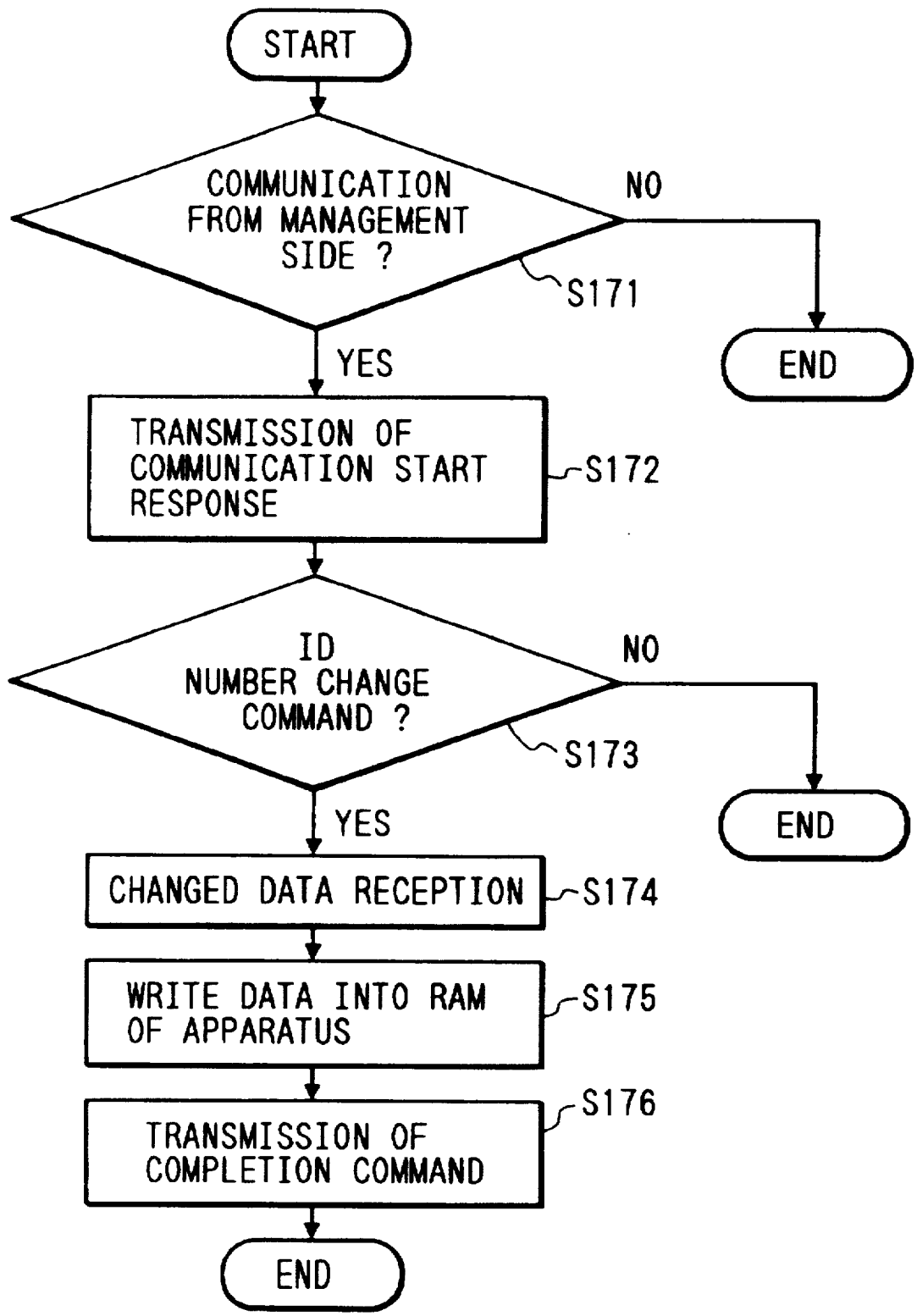
FIG. 17 is a flowchart for changing the connection control data in the sixth example.

Next, the control for changing the connection control data on the copying apparatus side in the sixth example will be described below with reference to the flowchart of FIG. 17.

At step S171, a check is made to determine whether the communication is started from the external device side. If the communication is started, the operation proceeds to step S172, where a response indicating that the communication start is detected is transmitted to the external device.

At step S173, the received command is checked. If it is a command for changing the ID number, the operation proceeds to step S174, where the ID number data in the connection control data is received, and then to step S175, where the received data is written via the CPU 901, the I/F 907, the I/F 805 and the CPU 801 into the RAM 803 in which the connection control data is stored. If the deletion of previous data and the writing of new data have been terminated, a completion command is transmitted to the external device at step S176, and the operation is ended.

With the above operation control, it is possible to change the ID number in the connection control data stored in the copying apparatus through the remote operation from the external device.

In this way, it is possible to perform the copy operation under the control of copy control means, and transmit or receive the data by connecting the communication line to a specific external device using the connection control data stored in connection data storing means under the control of communication control means.

And when the communication control means receives the data for changing the connection control data from the external device, transfer means transfers the connection control data received from the external device to the connection data storing means so as to replace the connection control data stored in the connection data storing means with the transferred connection control data, and thereafter the communication can be executed by connecting the line using newly stored communication control data.

As above described, since the stored connection control data necessary for the copying apparatus to start the communication can be rewritten with the remote operation from the external device, it is unnecessary for the serviceman to repair to the site to change the settings and it is possible to rapidly cope with a rewrite request of the connection control data from the user.

Figure 18:
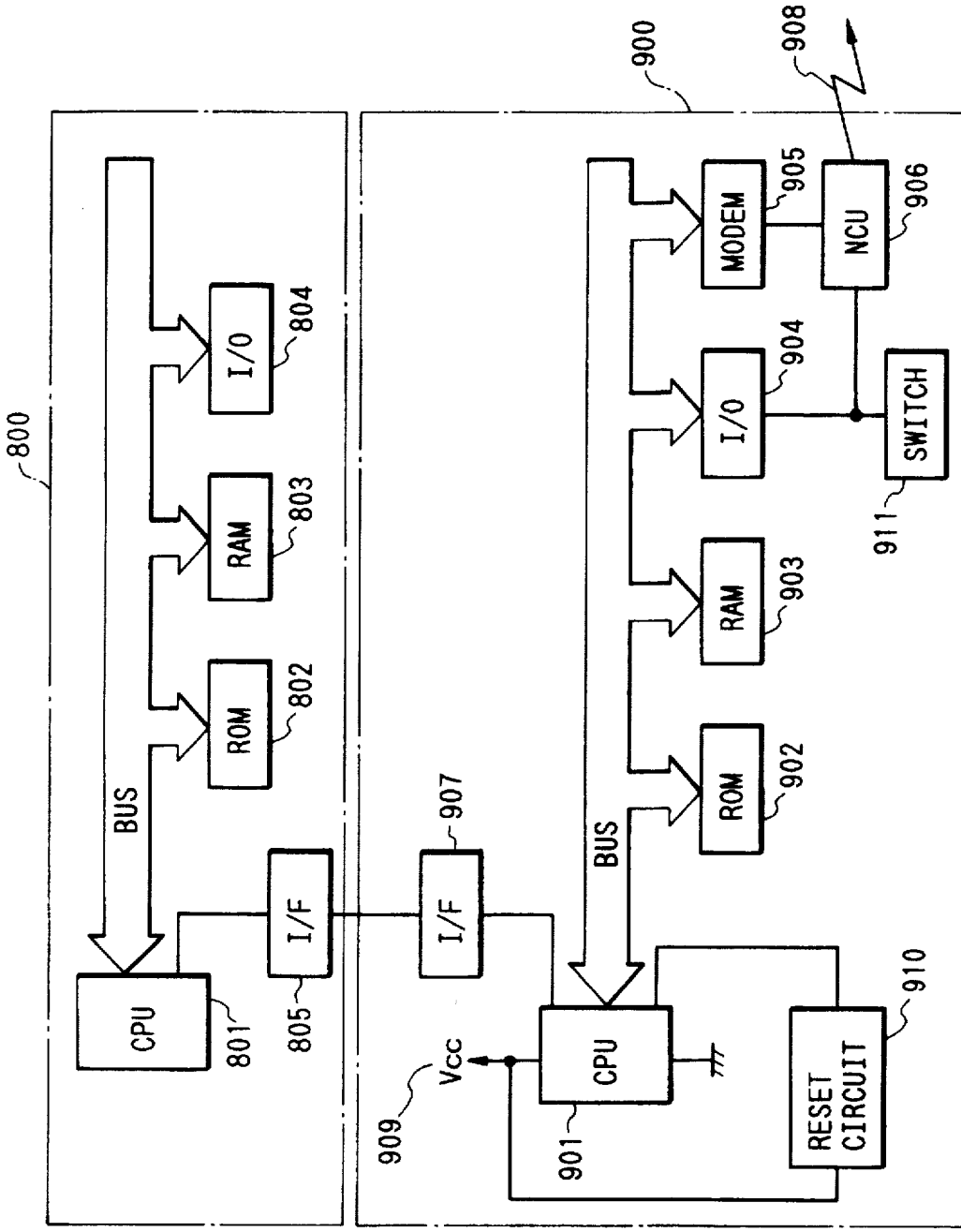
FIG. 18 is a block diagram of a copy controller 800 and a communication controller 900 in seventh, eighth and ninth examples.

FIG. 18 is a block diagram showing a copy controller 800 and a communication controller 900 in this example.

800 is the copy controller for controlling the copy operation of the copying apparatus main component 100, and 900 is the communication controller for controlling the communication with an external device 999.

801 is a central processing unit (hereinafter referred to as CPU) for controlling the whole copying apparatus 100, and 802 is a read-only memory (hereinafter referred to as ROM) for storing a control procedure (control program) of the copying apparatus main component 100, CPU 801 being able to control each component connected via a bus in accordance with the control procedure stored in the ROM 802. 803 is a random access memory (hereinafter referred to as RAM) useful for storing the input data or as a working storage area. 804 is an input/output portion for outputting a control signal of the CPU 801 to a load such as a main motor 113 and inputting a signal from a sensor for a fixing unit 122 and sending it to the CPU 801.

The communication controller 900 for controlling the communication through the external communication line 908 is controlled by a CPU 901. 902 is a read-only memory (ROM) for storing communication control and initial value input control procedures for the communication. And it is connected to the copy controller 800 of the copying apparatus main component 100 via RS-232C interfaces 805, 907, and if the data is transferred from the copy controller 800 of the copying apparatus main component 100 via the RS-232C interfaces 805, 907, its transferred data is temporarily stored in the RAM 903 provided in the communication controller 900, and after the data transfer from the copy controller 800 has been completed, a network control unit 906 (hereinafter referred to as NCU) controlled by the CPU 901 connects the communication line with the external and transfers the data to the external through a modem 905 and the NCU 906 after the line connection. Also, when the data transfer is made from the external, its transfer data is temporarily stored in RAM 903, and the data is transferred to the copy controller 800 via the RS-232C interfaces 805, 907 upon a request from the copy controller 800.

910 is a reset circuit connected to a power supply Vcc of the CPU 901 and the CPU 901, and 911 is an initial values input authorizing switch connected to an I/O 904 of the CPU 901 and the NCU 906 of the I/O 904. Note that either one of the reset circuit 910 and the initial values input authorizing switch 911 can be provided.

Next, the setting of initial values necessary for the transmission and reception to and from the external device will be described below.

When the data of the copying apparatus 100 is transferred to the external device 999 such as a computer on the management side through a telephone line, or conversely, the data is transferred from the computer 999 on the management side to the copying apparatus 100, the data is transferred using a device ID registered in both the copying apparatus main component and the computer on the management side, a password, and a telephone number of a communication partner registered in the copying apparatus main component.

And the device ID, the password and the telephone number of communication partner are referred to as the initial values for starting the communication.

First, the outline of the data transfer using the initial values will be described below. In calling from the copying apparatus 100 side, the telephone number of the communication partner registered in the copying apparatus main component is called, and after the line connection, the device ID from the copying apparatus side is judged with the computer 999 on the management side, and a corresponding password is returned. This password is checked on the copying apparatus side, and then the data transfer is started if the password is normal.

Next, in calling from the computer 999 on the management side, the copying apparatus 100 on the user side is called, and after the line connection, the device ID from the copying apparatus 100 side is judged with the computer 999 on the management side, and a corresponding password is returned. If this password is normal on the copying apparatus 100 side, the line is once disconnected. And the data transfer is started by performing a calling operation from the copying apparatus side as previously described.

In this way, the start of data transfer can be conducted only if the initial values as above described are correctly registered.

While in this example, the initial values are transmitted as the data from the host computer 999 on the management department side to the communication controller 900, and set by being stored in the RAM 903 via the modem 905, it is apprehended that other telephone number ID and password may be set by a computer other than that on the normal management base. Therefore, the initial values should not be easily set. A measure to prohibit the arbitrary setting of the initial values will be described below.

If an "ID" key 635 is depressed while the "*" key 601 is depressed, on the operation unit 600 as shown in FIG. 5 which is provided in the copying apparatus 100, a message "Initial data reception permitted?" is displayed on the LCD display screen 701. If an "OK" key 628 is then depressed, a message "Authorized state" is displayed on the LCD 701 for a certain time, and the data for authorizing the setting of initial data is transmitted from the copy controller 800 to the communication controller 900 whereby an authorization flag is set up at a specific address of the RAM 903 for the communication controller 900 to be placed in the authorized state.

In this authorized state, the previously-mentioned initial values are received from the host computer 999 on the management base, and if the reception is terminated, the authorized flag is cleared so that the operation is placed in an inhibit state for inhibiting the input of the initial values. In this way, as the input of initial values is not allowed unless any operation is made from the operation unit 600 again, it is possible to prevent the imprudent, undue input of initial values.

An eighth example will be described below. The constitution is the same as that in the previous examples.

If a power supply Vcc 909 of the CPU 901 in the communication controller 900 as shown in FIG. 18 is turned on, a reset pulse for the CPU 901 is issued from the reset circuit 910, and after the CPU 901 is reset, a specific area in the RAM 903 is initialized, whereby the authorized flag for setting the initial values is set up at a specific address so that the operation is placed in the authorized state.

Thereafter, the initial values are received from the host computer 999 on the management department, and if the reception is terminated, the authorized flag is cleared so that the operation is placed in the inhibit state for inhibiting the input of the initial values. And after the power supply Vcc 909 is turned off again, the input of the initial values is inhibited unless the power supply is turned on again.

In this case, the power supply Vcc 909 is turned on independently of a power on switch of the copying apparatus main component 100, and desirably turned on or off by the specific operator.

With initial values input authorizing means formed by the reset circuit as above mentioned, it is possible to prevent the imprudent, undue input of the initial values.

Further, a ninth example will be described below.

In the communication controller 900 as shown in FIG. 18, if the initial values input authorizing switch 911 connected to the I/O 904 of the CPU 901 is turned on, the authorized flag is set up at a specific address of the RAM 903 so that the operation is placed in the authorized state.

Thereafter, the initial values are received from the host computer 999 on the management base, and if the reception is terminated, the authorized flag is cleared so that the operation is placed in an inhibit state for inhibiting the input of the initial values. And the input of the initial values is inhibited unless the power supply is turned on again.

In this way, it is possible to prevent the imprudent, undue input of the initial values by hiding the presence of the initial values input authorizing switch 911.

Note that these examples can be used in any combination thereof.

As above described, the copying apparatus can perform the copying operation under the control of copy control means, and transmit or receive the data through the communication line to an external device under the control of communication control means.

And when setting the initial values necessary for the transmission or reception to or from the external device, the necessary initial values can be input by manipulating the initial values input authorizing means, whereby it is possible to prevent the imprudent, wrong setting of initial values or the inconvenient setting of initial values by other than the person in charge, and thus to provide a copying apparatus which high security without the leakage of data.

What is claimed is:

1. An equipment control unit for controlling a local apparatus, said equipment control unit comprising:

storage means for storing control data for controlling a local operation of the local apparatus;

control means connected to said storage means for controlling the local apparatus in accordance with the control data stored in said storage means;

communication means connected to said storage means and said control means for communicating with a remote centralized control system that performs centralized control for the local apparatus and a plurality of other corresponding apparatus; and rewrite means for permitting the rewrite of the control data, said rewrite means comprising a reset circuit connected to a power supply circuit of said control means providing a control voltage, said reset circuit resetting said control means with a threshold voltage of the control voltage arising when power for said control means is turned on so that the rewrite of said storage means is permitted, wherein, when said rewrite means permits rewrite of the control data, said control means rewrites the control data stored in said storage means with received corresponding control data when said communication means receives the corresponding control data from said centralized control system.

2. An equipment control unit for controlling a local apparatus, said equipment control unit comprising:

communication means for communicating with a remote centralized control system that performs centralized control for the local apparatus and a plurality of other corresponding apparatus;

storage means connected to said communication means for storing control data for controlling a local operation of the local apparatus and operation of said communication means;

control means connected to said communication means and said storage means for controlling the communication means in accordance with the control data stored in said storage means; and rewrite means for permitting the rewrite of the control data, said rewrite means comprising a reset circuit connected to a power supply circuit of said control means providing a control voltage thereto, said reset circuit resetting said control means with a threshold voltage of the control voltage arising when power for said control means is turned on so that the rewrite of said storage means is permitted, wherein, when said rewrite means permits rewrite of the control data, said control means rewrites the control data stored in said storage means with received corresponding control data when said communication means receives the corresponding control data from said centralized control system.

3. A method for controlling a local apparatus using an equipment control unit, comprising the steps of:

storing control data for controlling a local operation of the local apparatus;

controlling the local apparatus in accordance with the control data using a control means in the equipment control unit;

performing communication between the equipment control unit and a remote centralized control system that performs centralized control for the local apparatus and a plurality of other corresponding apparatus; and permitting rewrite of the stored control data with corresponding control data received from the remote centralized control system during said performing communication step by resetting the control means with a threshold voltage of a control voltage arising when power for the control means is turned on to permit rewrite of the stored control data.

4. A method for controlling a local apparatus using an equipment control unit, comprising the steps of:

performing communication, using a communication means, between an equipment control unit and a remote centralized control system that performs centralized control for the local apparatus and a plurality of other corresponding apparatus;

storing control data for controlling a local operation of the local apparatus and operation of the communication means;

controlling the communication means in accordance with control data stored in said storing step using a control means; and permitting the rewrite of the stored control data with corresponding control data received from the centralized control system during the performing communication step by providing a control voltage to the control means by a power supply circuit and resetting the control means with a threshold voltage of the control voltage arising when the power for the control means is turned on so that the rewrite of the storage means is permitted.

5. A communication apparatus for transmitting data including control data inputted from a local apparatus to a host computer, said communication apparatus comprising:

communication means for making data communication with the host computer;

storage means for storing data;

control means for controlling said communication means in accordance with the data stored in said storage means;

generating means for generating an initialization signal;

initializing means for initializing a specific area in said storage means in response to the initialization signal generated by said generating means; and permission and inhibition means for permitting storing of the data to said storage means by the host computer in response to the generation of the initialization signal by said generating means, and for inhibiting storing of the data after the storing of the data has once been performed unless the initialization signal is newly generated by said generating means.

6. An apparatus according to claim 5, wherein the local apparatus is an image forming apparatus that forms images on a sheet.

7. An apparatus according to claim 6, wherein the image forming apparatus is a copying machine.

8. An apparatus according to claim 5, wherein the data is a calling number of the host computer.

9. An apparatus according to claim 5, wherein the data is a password.

10. An apparatus according to claim 5, wherein the data is an ID of the local apparatus.

11. An apparatus according to claim 5, wherein the initialization signal is a reset pulse.

12. An apparatus according to claim 5, wherein said generating means generates the initialization signal when a power source of said communication apparatus is turned on.

13. An image forming apparatus for forming images on a sheet and transmitting data including control data thereof, said image forming apparatus comprising:

communication means for making communication of data with a host computer;

storage means for storing data;

control means for controlling said communication means in accordance with the data stored in said storage means;

generating means for generating an initialization signal;

initializing means for initializing a specific area in said storage means in response to the initialization signal generated by said generating means; and permission and inhibition means for permitting storing of the data to said storage means by the host computer in response to the generation of the initialization signal by said generating means, and for inhibiting storing of the data after the storing of the data has once been performed unless the initialization signal is newly generated by said generating means.

14. An apparatus according to claim 13, wherein said image forming apparatus is a copying machine.

15. An apparatus according to claim 13, wherein the data is a calling number of the host computer.

16. An apparatus according to claim 13, wherein the data is a password.

17. An apparatus according to claim 13, wherein the data is an ID of said image forming apparatus.

18. An apparatus according to claim 13, wherein the initialization signal is a reset pulse.

19. An apparatus according to claim 13, wherein said generating means generates the initialization signal when a power source is turned on.

20. A communication method for communicating data including control data between a local apparatus and a host computer, said method comprising the steps of:

controlling data communication in accordance with data stored in a storage means;

initializing a specific area in said storage means in response to a generation of an initialization signal; and permitting storing of the data to the storage means by the host computer in response to the generation of the initialization signal, and inhibiting storing of the data after the storing of the data has once been performed unless the initialization signal is newly generated.

21. A method according to claim 20, wherein the local apparatus is an image forming apparatus that forms images on a sheet.

22. A method according to claim 21, wherein the image forming apparatus is a copying machine.

23. A method according to claim 20, wherein the data is a calling number of the host computer.

24. A method according to claim 20, wherein the data is a password.

25. A method according to claim 20, wherein the data is an ID of the local apparatus.

26. A method according to claim 20, wherein the initialization signal is a reset pulse.

27. A method according to claim 20, wherein the initialization signal is generated when a power source is turned on.

* * * * *

UNITED STATES PATENT AND TRADEMARK OFFICE
CERTIFICATE OF CORRECTION

PATENT NO.   : 5,894,416

DATED        : April 13, 1999

INVENTOR(S)  : SATOSHI KUROYANAGI, ET AL.

It is certified that error appears in the above-identified patent and that said Letters Patent is hereby corrected as shown below:

Foreign Application Priority Data

[30]

"385610" should read --3-85610--.
"385615" should read --3-85615--.
"385618" should read --3-85618--.

COLUMN 4

Line 19, "charger 11" should read --charger 111--.

COLUMN 5

Line 1, "double hyphen sided" should read --double-sided--.

UNITED STATES PATENT AND TRADEMARK OFFICE
CERTIFICATE OF CORRECTION

PATENT NO. : 5,894,416

DATED : April 13, 1999

INVENTOR(S) : SATOSHI KUROYANAGI, ET AL.

It is certified that error appears in the above-identified patent and that said Letters Patent is hereby corrected as shown below:

COLUMN 14

Line 35, "which" should read --with--.

Signed and Sealed this

Twenty-ninth Day of August, 2000

Attest:

Q. TODD DICKINSON

*Attesting Officer*  *Director of Patents and Trademarks*